(12) United States Patent
Crawford et al.

(10) Patent No.: US 11,401,953 B2
(45) Date of Patent: Aug. 2, 2022

(54) FLUID CONDUIT AND METHOD OF MAKING SAME

(71) Applicant: Eaton Intelligent Power Limited, Dublin (IE)

(72) Inventors: Frank T. Crawford, Southampton (GB); Subrata Sarkar, Pune (IN); Abhijit Borawake, Pune (IN); Sean Brown, Mentor, OH (US); Lucas Stahl, Livonia, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 664 days.

(21) Appl. No.: 15/966,336

(22) Filed: Apr. 30, 2018

(65) Prior Publication Data

US 2019/0331141 A1   Oct. 31, 2019

(51) Int. Cl.
| | |
|---|---|
| *F04F 5/46* | (2006.01) |
| *B29C 64/153* | (2017.01) |
| *B29C 64/40* | (2017.01) |
| *B33Y 80/00* | (2015.01) |
| *B29L 23/00* | (2006.01) |
| *B33Y 10/00* | (2015.01) |

(52) U.S. Cl.
CPC .............. *F04F 5/46* (2013.01); *B29C 64/153* (2017.08); *B29C 64/40* (2017.08); *B29L 2023/22* (2013.01); *B33Y 10/00* (2014.12); *B33Y 80/00* (2014.12)

(58) Field of Classification Search
CPC ..... F04F 5/46; F04F 5/00; F16L 41/02; F16L 41/021
See application file for complete search history.

(56) References Cited

U.S. PATENT DOCUMENTS

| | | | | |
|---|---|---|---|---|
| 277,072 | A | * 5/1883 | Sherriff .................... | F04F 5/46 417/174 |
| 316,804 | A | * 4/1885 | Messinger ............... | F04F 5/46 417/151 |
| 885,805 | A | * 4/1908 | Tillinghast ............. | F16L 41/02 137/176 |
| 1,105,985 | A | * 8/1914 | McClymont ............. | F04F 5/46 417/151 |

(Continued)

FOREIGN PATENT DOCUMENTS

| | | | |
|---|---|---|---|
| DE | 102016206616 A1 | * 10/2017 | ............ F16L 37/098 |
| JP | 2018031343 A | * 3/2018 | ............ F02B 37/025 |
| WO | 17/008163 A1 | 1/2017 | |

OTHER PUBLICATIONS

Jet Pump—Fuel Scavenge—Part No. 38-0001; Eaton Power Business Worldwide; 2 pages.

(Continued)

*Primary Examiner* — David Bochna
(74) *Attorney, Agent, or Firm* — Merchant & Gould P.C.

(57) ABSTRACT

A fluid conduit includes, a body, a first conduit portion connected to the body, a second conduit portion connected to the body, and a base connected to the second conduit portion. The body, the first conduit portion, the second conduit portion, and the base may be formed as a monolithic component via additive manufacturing. A method of making a fluid conduit may include forming sets of layers. The set of layers may include parts or portions of the fluid conduit and/or supports.

20 Claims, 34 Drawing Sheets

(56) References Cited

U.S. PATENT DOCUMENTS

| | | | | |
|---|---|---|---|---|
| 1,835,603 A * | 12/1931 | Kincaid, Jr. | ............... | F04F 5/46 417/183 |
| 2,268,656 A * | 1/1942 | Haltmeier | ................. | F04F 5/46 417/196 |
| 2,631,774 A * | 3/1953 | Plummer, Jr. | ............ | F04F 5/46 417/151 |
| 3,323,468 A * | 6/1967 | Thompson | ................ | F04F 5/46 417/181 |
| 3,446,157 A * | 5/1969 | Schafer | ..................... | F04F 5/46 417/181 |
| 4,963,073 A * | 10/1990 | Tash | .......................... | F04F 5/46 417/151 |
| 5,070,849 A * | 12/1991 | Rich | .......................... | F04F 5/54 123/509 |
| 2001/0003285 A1 * | 6/2001 | Hua | .......................... | F04F 5/46 137/597 |
| 2002/0031431 A1 * | 3/2002 | Akiyama | ................. | F04F 5/46 417/198 |
| 2005/0139727 A1 | 6/2005 | Wozniak et al. | | |
| 2005/0284394 A1 * | 12/2005 | Lindgren | ................. | F04F 5/46 119/215 |
| 2006/0180535 A1 * | 8/2006 | Yu | .......................... | F02M 37/50 210/172.3 |
| 2010/0319793 A1 * | 12/2010 | Smid | ......................... | F04F 5/46 137/565.22 |
| 2011/0139278 A1 * | 6/2011 | Kawajiri | ............ | B01D 35/0273 137/565.01 |
| 2012/0000555 A1 * | 1/2012 | Koba | ........................ | F15D 1/00 137/565.01 |
| 2014/0196809 A1 * | 7/2014 | Klein | ...................... | F16L 55/24 138/39 |
| 2017/0291714 A1 | 10/2017 | Corman | | |
| 2018/0187633 A1 * | 7/2018 | Lee | ............................ | F04F 5/46 |
| 2019/0242486 A1 * | 8/2019 | Rosaen | ....................... | F04F 5/46 |
| 2020/0263707 A1 * | 8/2020 | Kohn | ........................ | F04F 5/46 |

OTHER PUBLICATIONS

Jet Pump—Fuel Transfer—Part No. 38-0013; Eaton Power Business Worldwide; 2 pages.
Aerospace Capabilities—Flying Safely and Efficiently with Eaton; Eaton Powering Business Worldwide; 20 pages.
International Search Report, PCT/EP2019/060974, filed Aug. 30, 2019.
European Office Action, 19724749.7, dated Dec. 8, 2020.

* cited by examiner

FLUID CONDUIT AND METHOD OF MAKING SAME

TECHNICAL FIELD

The present disclosure generally relates to fluid conduits, including fluid conduits that may be used in connection with aircraft, such as with pumps, pump systems, scavenge pumps, ejector pumps, and jet pumps, among others.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some fluid conduits may include a plurality of components that may be fastened together with a plurality of fasteners and a plurality of discrete sealing members, such as O-rings. Such fluid conduits may be relatively complex, difficult to assemble, heavy, and/or expensive to produce. Traditional manufacturing methods (e.g., machining, casting, etc.) may not be capable of forming a fluid conduit such that fewer components or sealing members may be utilized.

There is a desire for solutions/options that minimize or eliminate one or more challenges or shortcomings of fluid conduits. The foregoing discussion is intended only to illustrate examples of the present field and should not be taken as a disavowal of scope.

SUMMARY

In embodiments, a fluid conduit may include, a body, a first conduit portion connected to the body, a second conduit portion connected to the body, and/or a base connected to the second conduit portion. The body, the first conduit portion, the second conduit portion, and the base may be formed as a monolithic component via additive manufacturing.

With embodiments, a method of making a fluid conduit may include forming a first set of layers, the first set of layers including parts of a first support, a second support, and a third support; forming a second set of layers, the second set of layers including portions of the body and the second support; forming a third set of layers, the third set of layers including portions of the body and the second conduit portion; and/or forming a fourth set of layers, the fourth set of layers including portions of the first conduit portion.

In embodiments, a fluid conduit may include a body, a first conduit portion, a second conduit portion, and a base. A method of making a fluid conduit may include forming a first set of layers, the first set of layers including parts of a first support, a second support, a third support, and a fourth support; forming a second set of layers, the second set of layers including portions of the body, the first support, the second support, and the base; forming a third set of layers, the third set of layers including portions of the body, the first support, the second conduit portion, and the base; forming a fourth set of layers, the fourth set of layers including portions of the body and the first support; and/or forming a fifth set of layers, the first set of layers including portions of the first conduit portion.

The foregoing and other aspects, features, details, utilities, and/or advantages of embodiments of the present disclosure will be apparent from reading the following description, and from reviewing the accompanying drawings.

DETAILED DESCRIPTION

Figure 1:
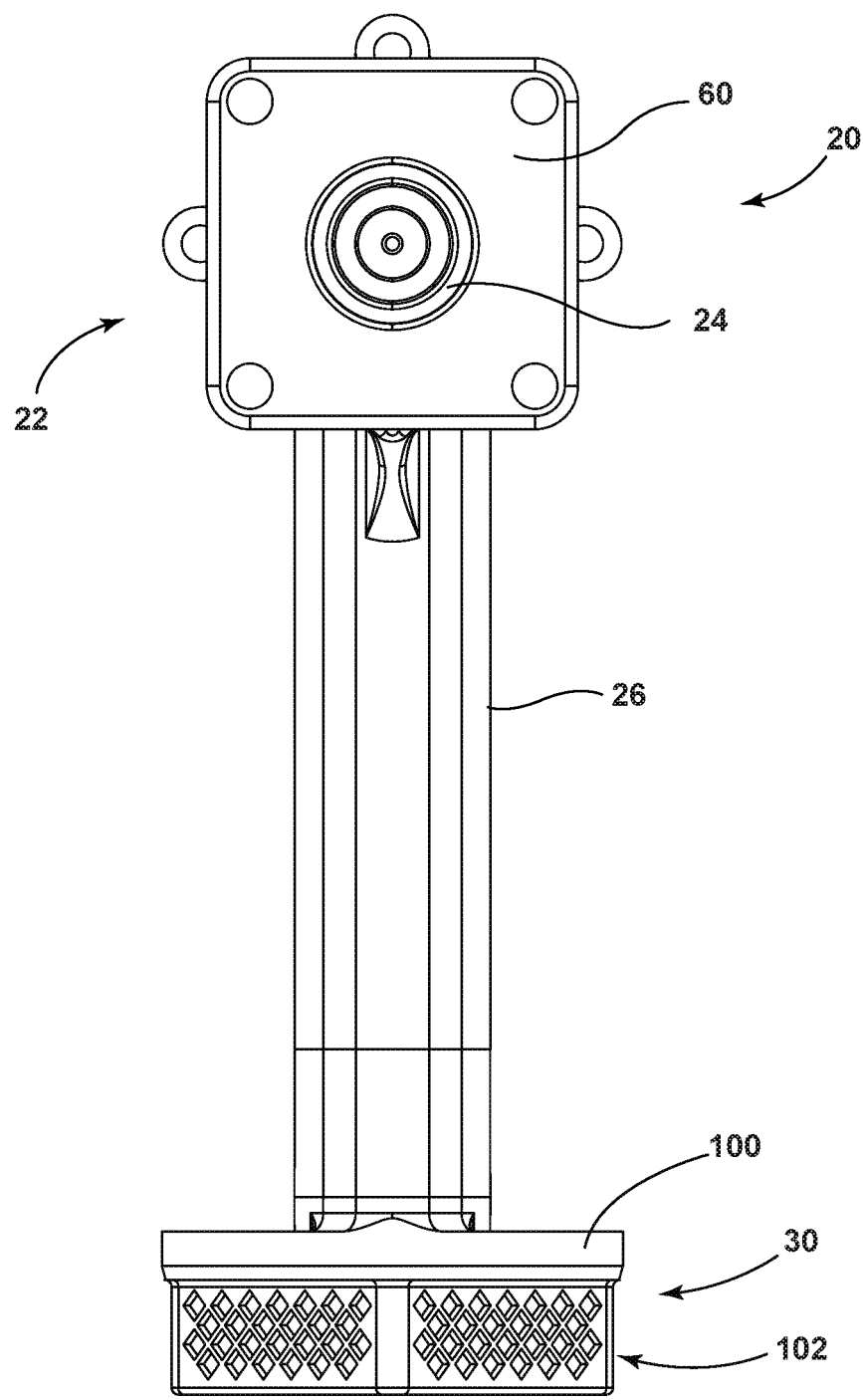
FIG. 1 is a front view generally illustrating an embodiment of a fluid conduit according to teachings of the present disclosure.
Figure 2:
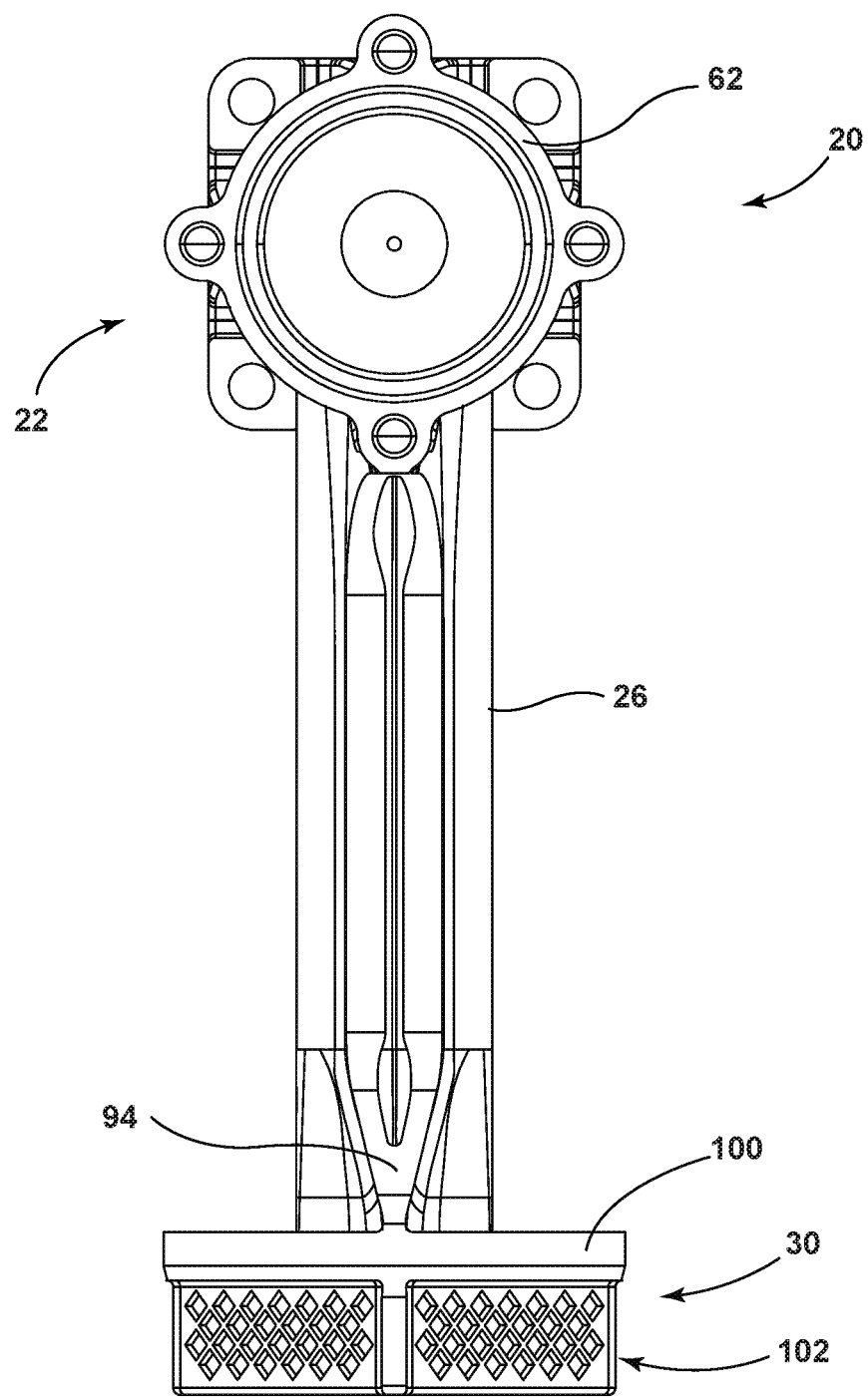
FIG. 2 is a rear view generally illustrating an embodiment of a fluid conduit according to teachings of the present disclosure.
Figure 3:
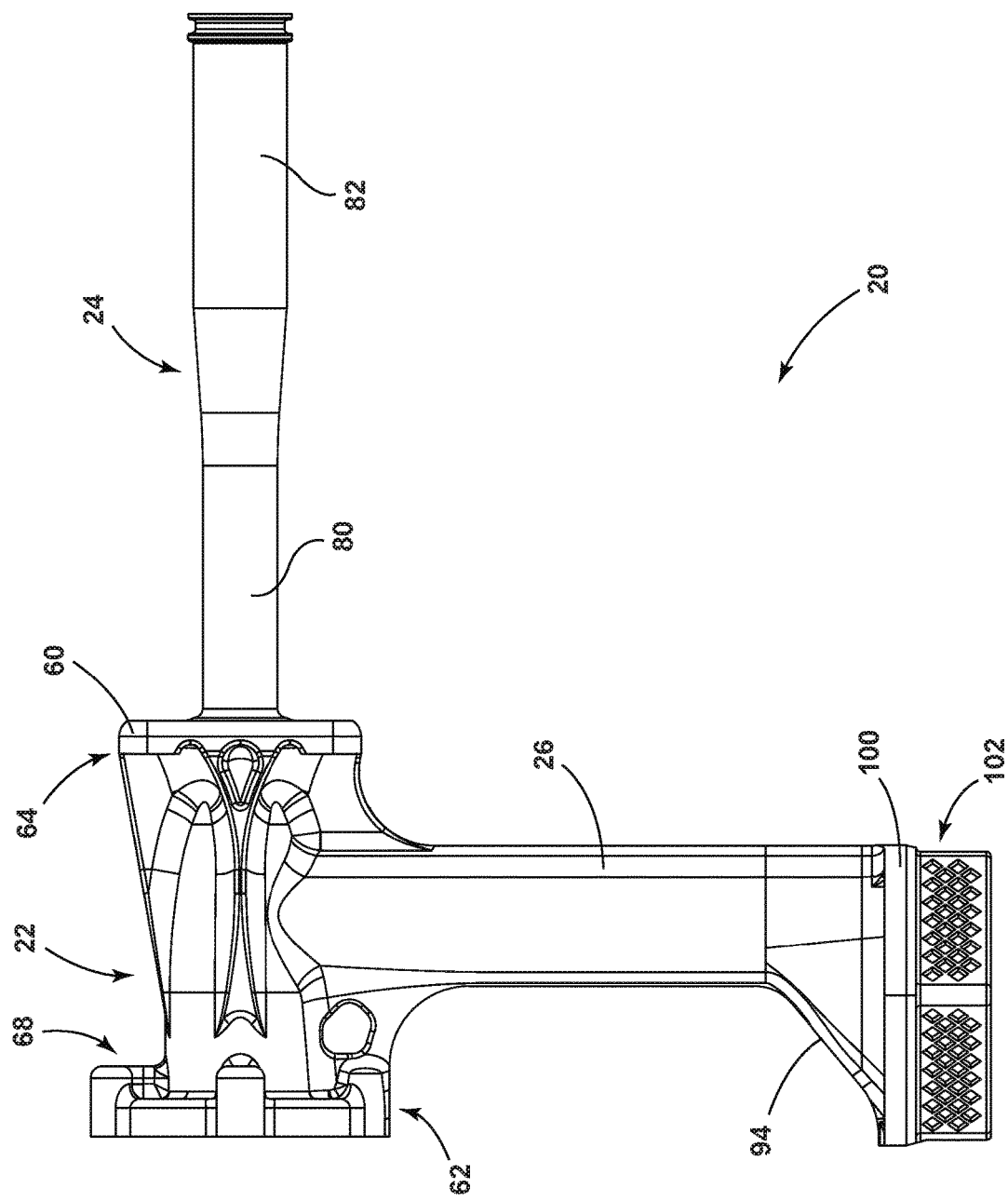
FIG. 3 is a left side view generally illustrating an embodiment of a fluid conduit according to teachings of the present disclosure.
Figure 4:
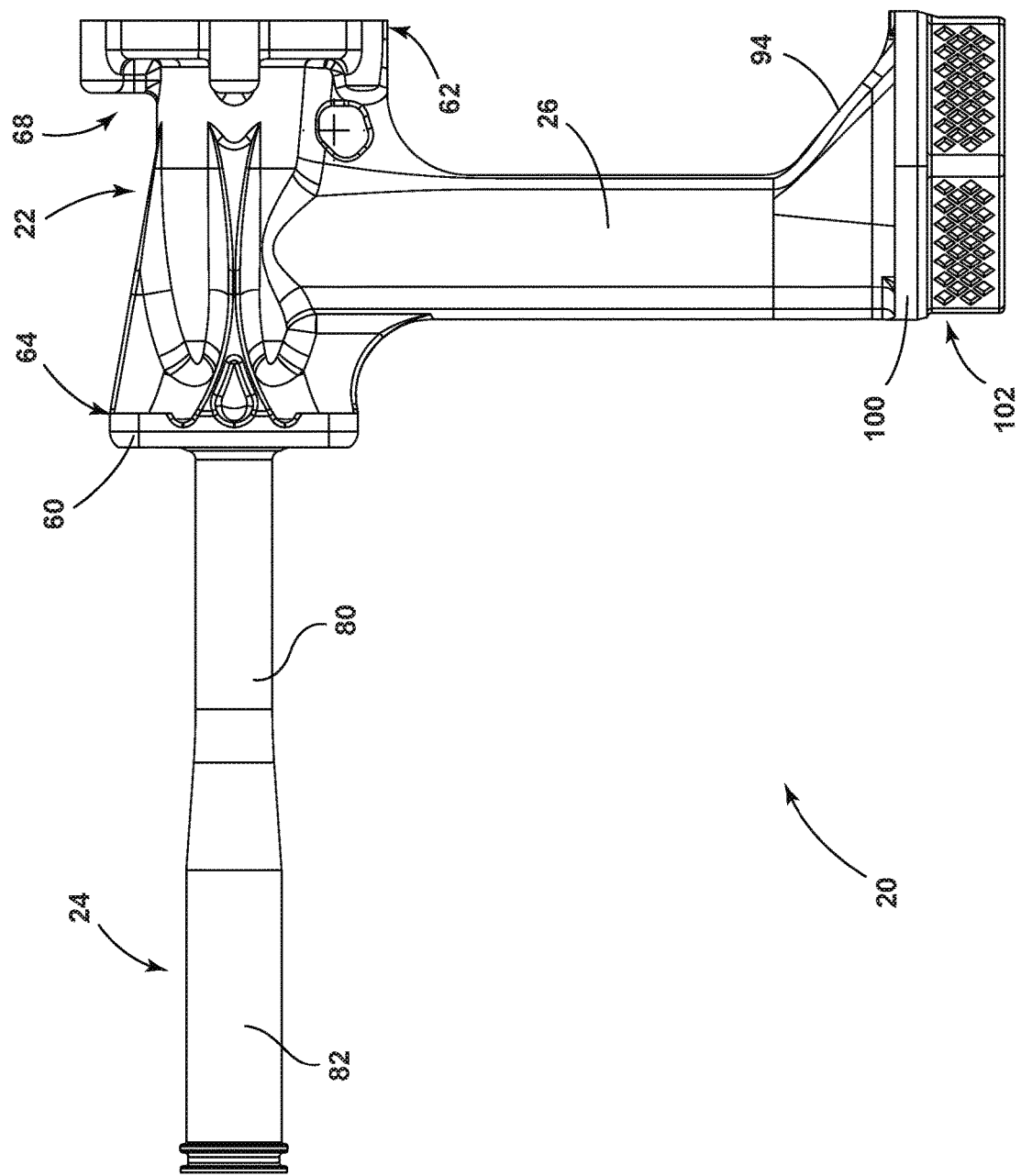
FIG. 4 is a right side view generally illustrating an embodiment of a fluid conduit according to teachings of the present disclosure.
Figure 5:
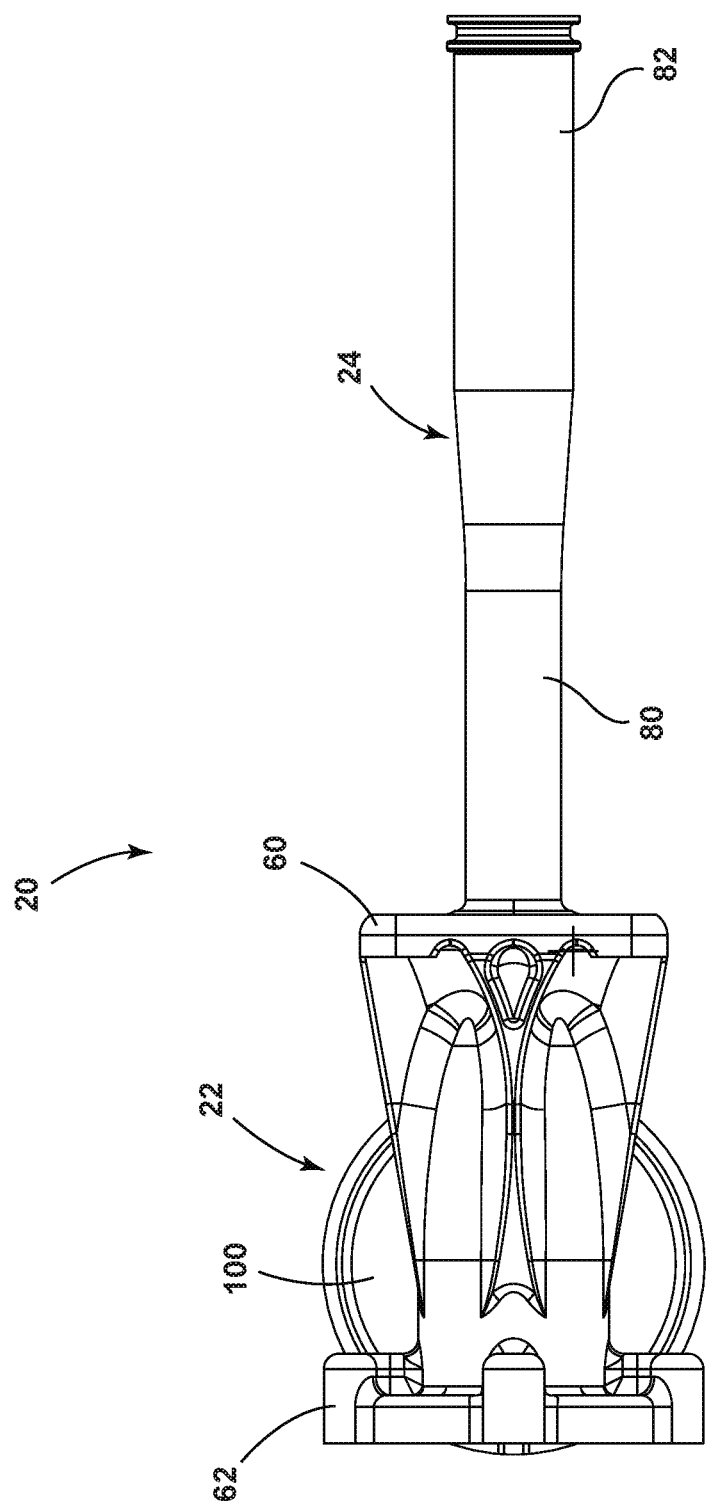
FIG. 5 is a top view generally illustrating an embodiment of a fluid conduit according to teachings of the present disclosure.
Figure 6:
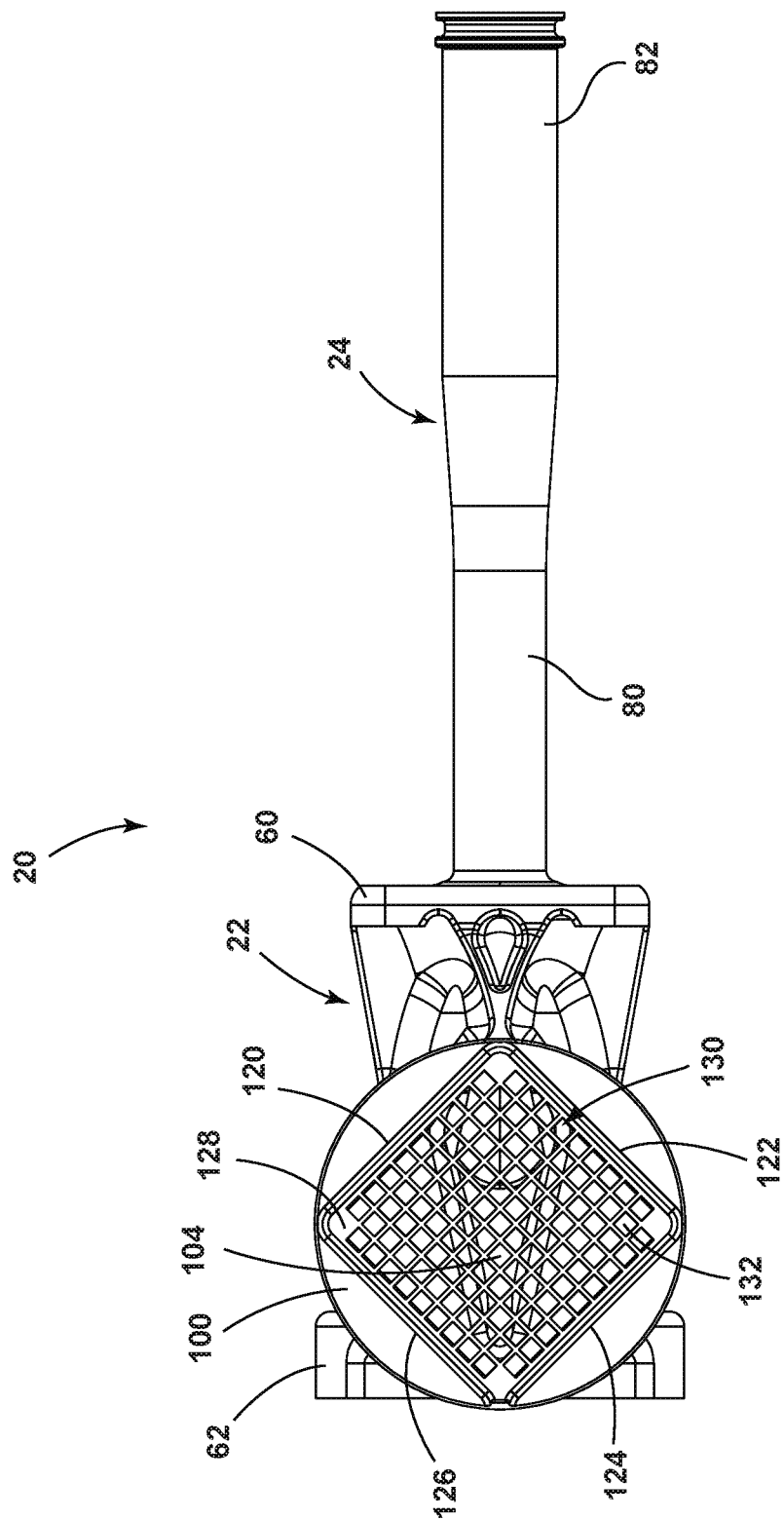
FIG. 6 is a bottom view generally illustrating an embodiment of a fluid conduit according to teachings of the present disclosure.
Figure 7:
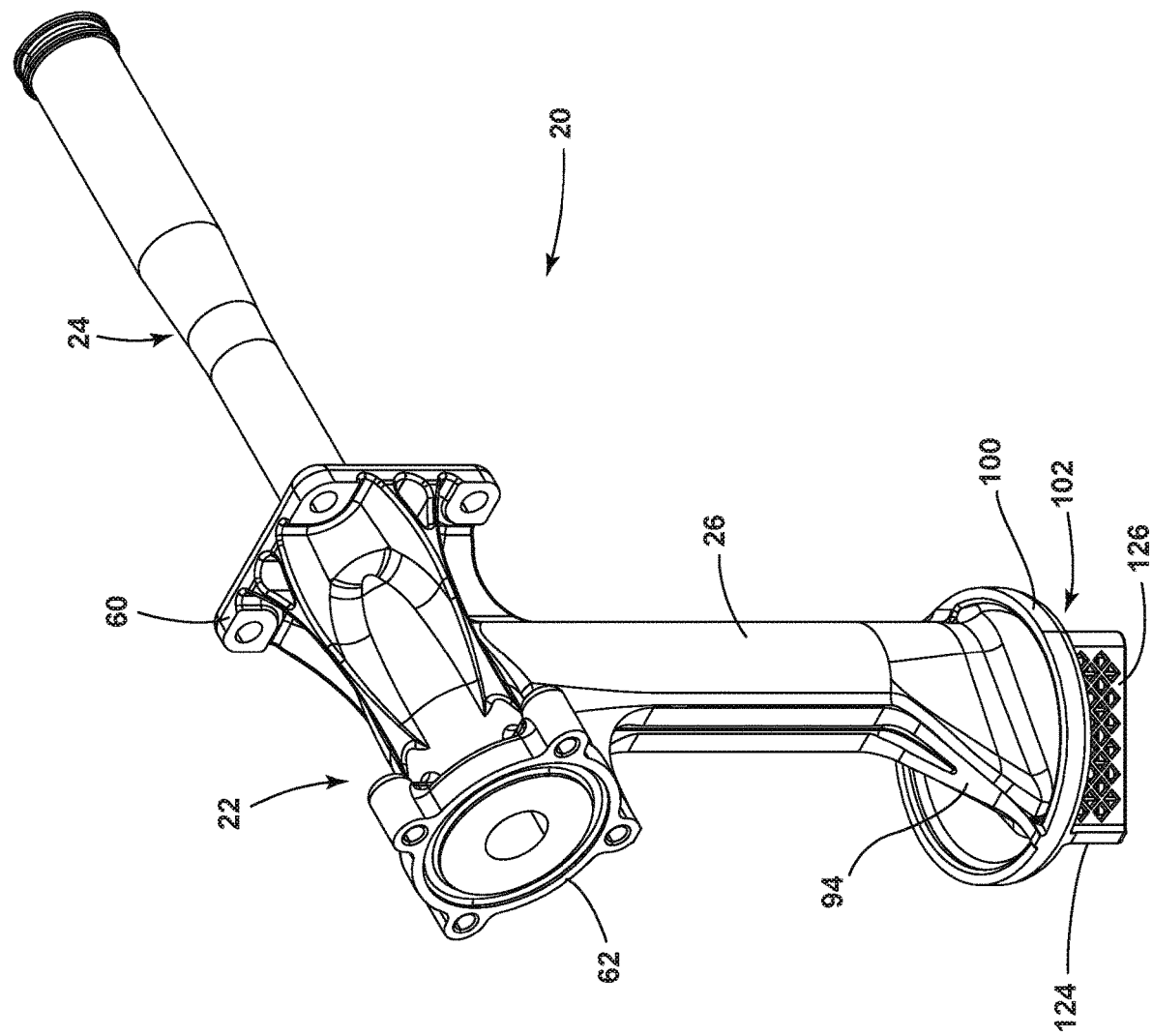
FIG. 7 is a perspective view generally illustrating an embodiment of a fluid conduit according to teachings of the present disclosure.
Figure 8:
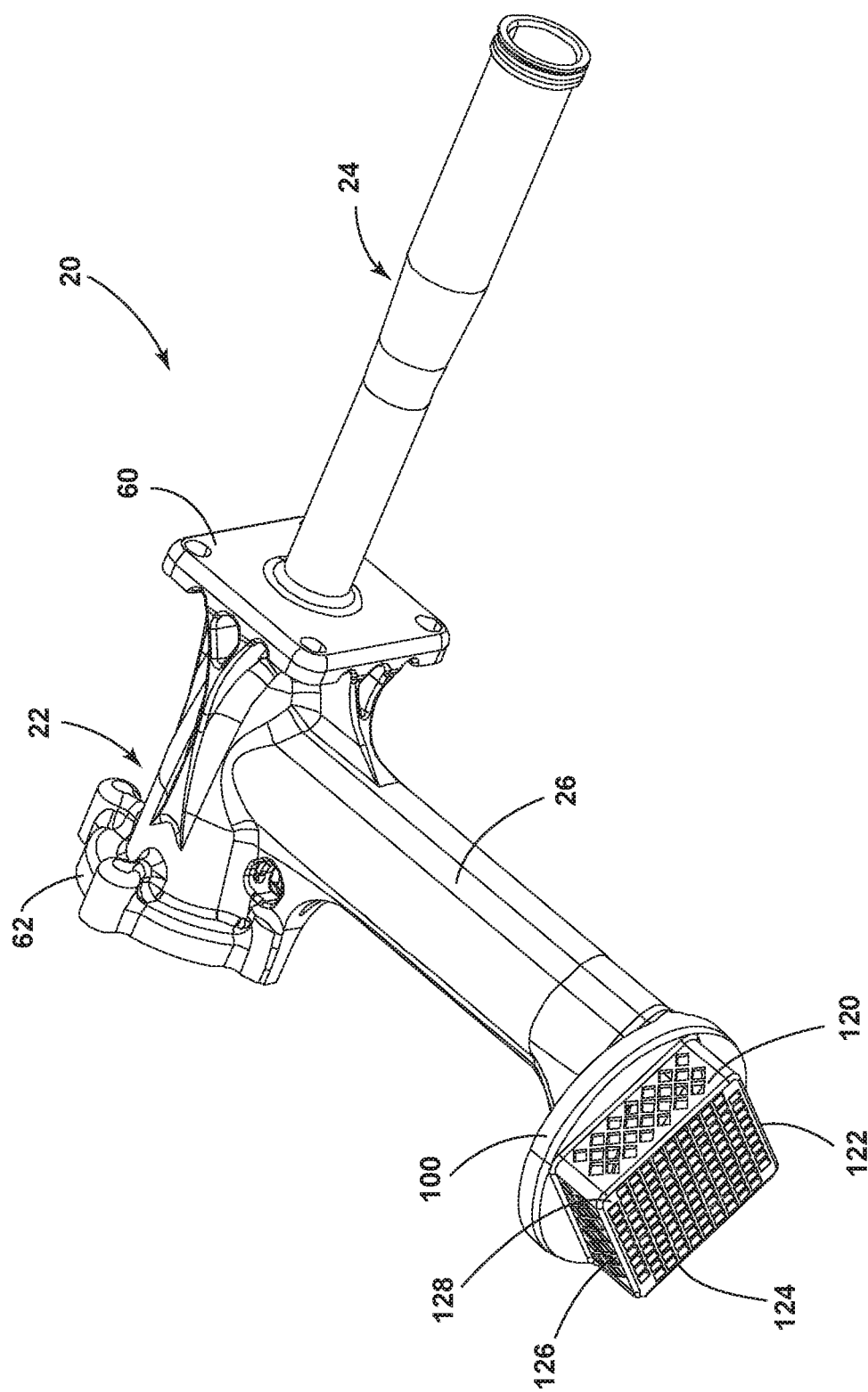
FIG. 8 is a perspective view generally illustrating an embodiment of a fluid conduit according to teachings of the present disclosure.

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

In embodiments, such as generally illustrated in FIGS. 1-8, a fluid conduit 20 may include a body 22, a first conduit portion 24 that may be connected to the body 22, a second conduit portion 26 that may be connected to the body 22, and/or a base 30 that may be connected to the second conduit portion 26. A fluid conduit 20 may, for example and without limitation, be configured as, for use with, and/or as a portion of a scavenge pump, an ejector pump, and/or a jet pump that may be used in connection with aircraft.

Figure 9:
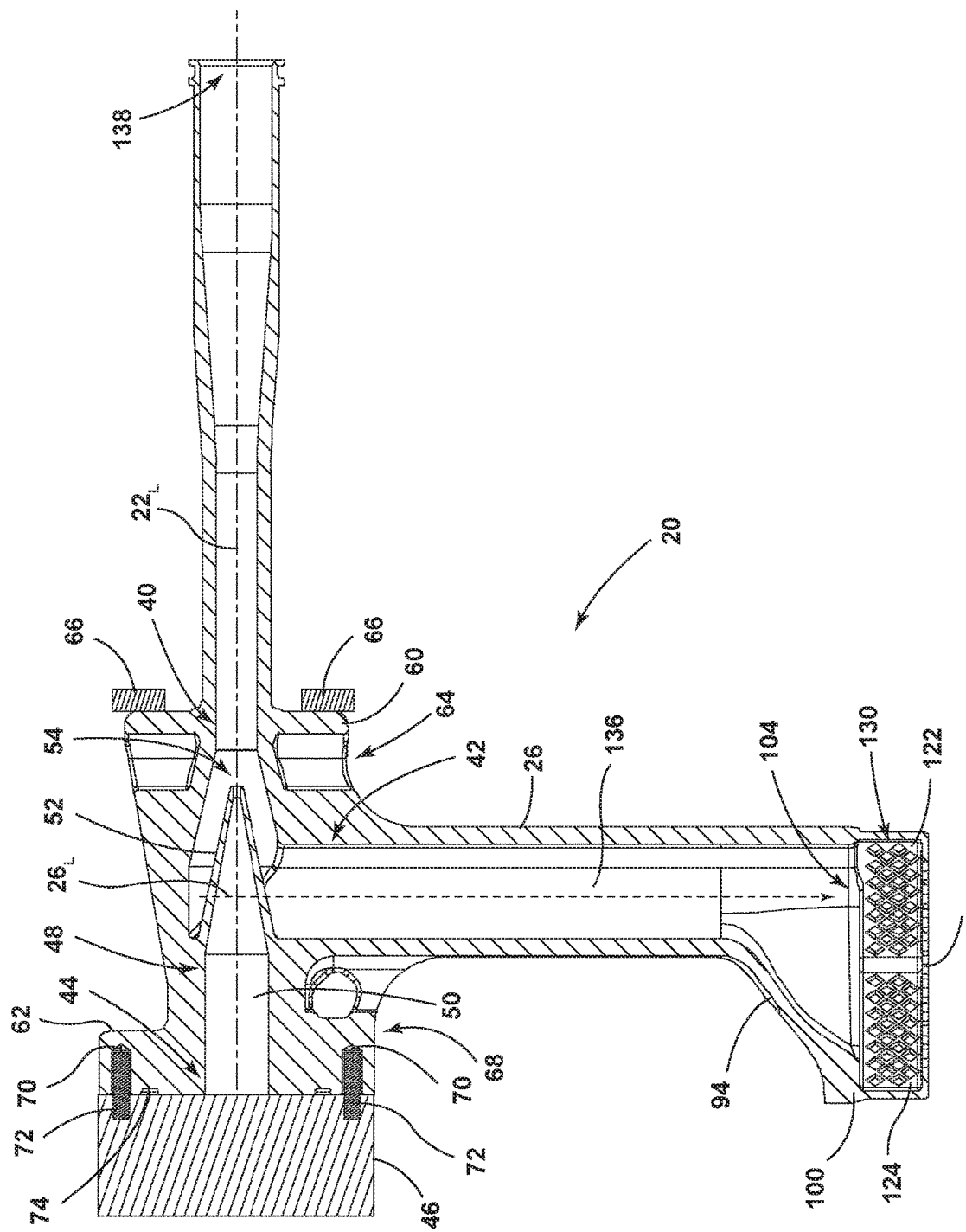
FIG. 9 is a cross-sectional view generally illustrating portions of an embodiment of a fluid conduit connected to a valve and a bracket according to teachings of the present disclosure.
Figure 10:
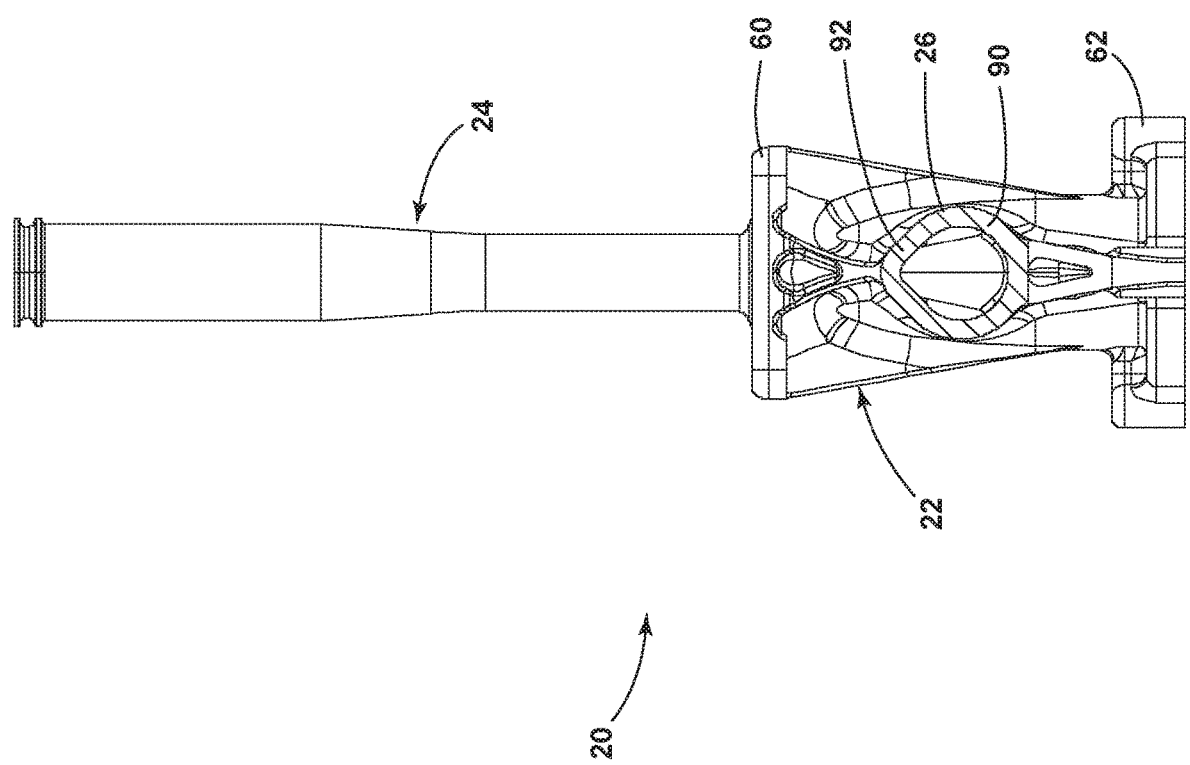
FIG. 10 is a cross-sectional view generally illustrating portions of an embodiment of a fluid conduit according to teachings of the present disclosure.

With embodiments, such as generally illustrated in FIG. 9, a body 22 of a fluid conduit 20 may include a first fluid port 40, a second fluid port 42, and/or a third fluid port 44. The first conduit portion 24 may be connected to and/or extend from the first fluid port 40. The second conduit portion 26 may be connected to and/or extend from the second fluid port 42. The third fluid port 44 may be configured for connection with an external component 46, such as, for example and without limitation, a valve and/or a fluid source (e.g., a fluid pump).

In embodiments, such as generally illustrated in FIG. 9, a body 22 may include a nozzle 48. The nozzle 48 may be connected to and/or extend from the third fluid port 44. The nozzle 48 may extend toward the first fluid port 40. The nozzle 48 may include a cavity 50 and/or a tapered portion 52. The tapered portion 52 may taper radially inward and toward the first fluid port 40 and/or may taper to an aperture 54 of the nozzle 48 that may include a diameter smaller than a diameter of the third fluid port 44. The nozzle 48 may be disposed such that a longitudinal axis 26L of the second conduit portion 26 may extend through the tapered portion 52 of the nozzle 48. The first conduit portion 24, the first fluid port 40, the third fluid port 44, and/or the nozzle 48 may be aligned (e.g., centered) with a longitudinal axis 22L of the body 22, which may be perpendicular or substantially perpendicular to the longitudinal axis 26L of the second conduit portion 26. The body 22 and/or the nozzle 48 may be configured for and/or to cause fluid flow via the Venturi effect.

With embodiments, a body 22 may include one or more flanges, such as a first flange 60 and/or a second flange 62. The first flange 60 may be disposed at or about a first (e.g., front) end 64 of the body 22 and the first conduit portion 24 may extend from the first flange 60. The first flange 60 may be configured for connection with an external component 66, such as a bracket (see, e.g., FIG. 9). The second flange 62 may be disposed at or about a second (e.g., rear) end 68 of the body 22 and the third fluid port 44 may be disposed in or about the second flange 62. The second flange 62 may be configured for connection with a valve 46. For example and without limitation, the second flange 62 may include one or more apertures 70 that may be configured to at least partially receive and/or engage respective fasteners 72 for connecting a valve 46 with the fluid conduit 20. A sealing member 74 may be disposed at least partially between second flange 62 and valve 46.

With embodiments, the first conduit portion 24 may extend from the first fluid port 40 of the body 22. The fluid conduit portion 24 may include one or more of a variety of shapes, sizes, configurations, and/or materials. For example and without limitation, the first conduit portion 24 may be generally cylindrical and may include a first portion 80 and a second portion 82. The first portion 80 may be connected to or extend from the first fluid port 40. The second portion 82 may extend from the first portion 80 and/or may include a larger diameter than the first portion 80.

Figure 11:
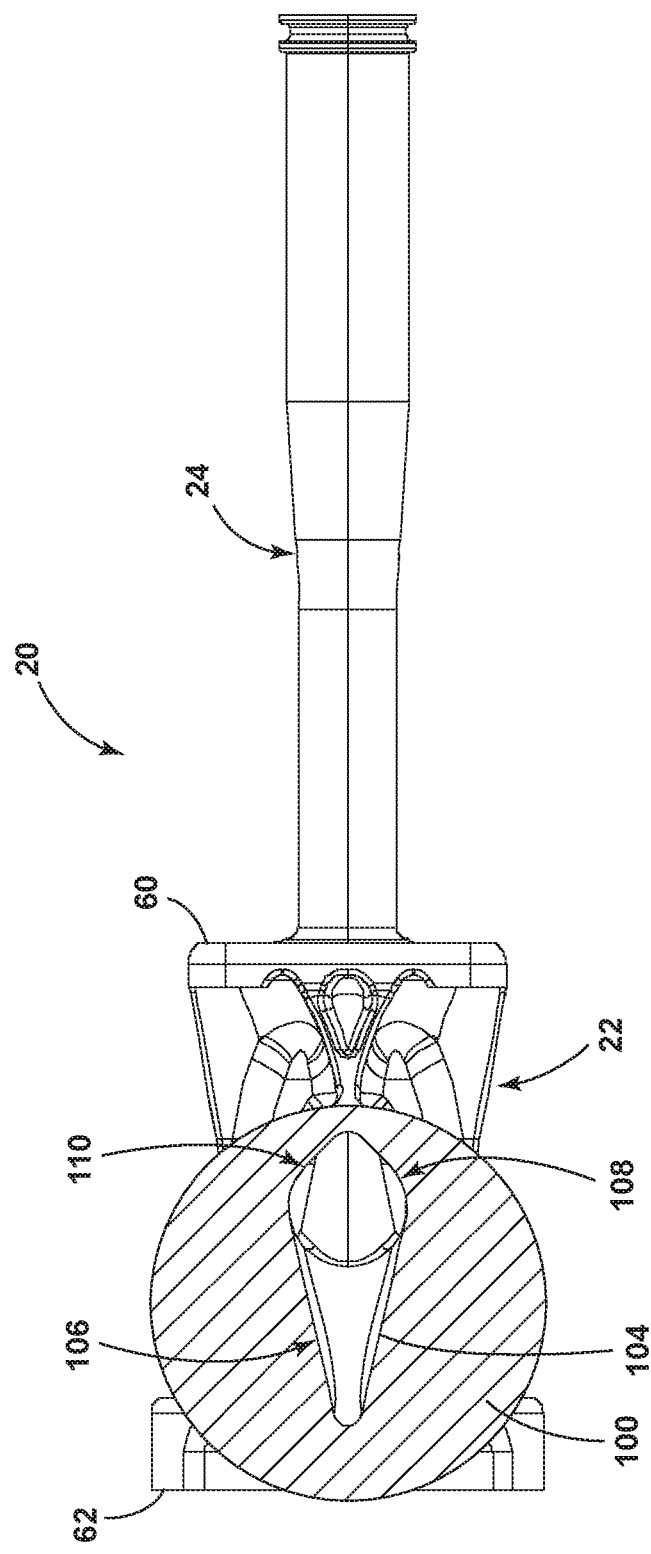
FIG. 11 is a cross-sectional view generally illustrating portions of an embodiment of a fluid conduit according to teachings of the present disclosure.

In embodiments, a second conduit portion 26 may be connected to the body 22 and/or the base 30. The second conduit portion 26 may provide fluid communication between the body 22 and the base 30. The second conduit portion 26 may include one or more shapes, sizes, configurations, and/or materials. For example and without limitation, and as generally illustrated in FIG. 11, the second conduit portion 26 may include a tear drop-shaped configuration (e.g., include a cross-sectional shape) that may include a rounded portion 90 and an angled or pointed portion 92. The rounded portion 90 may be disposed at or about a rear of the second conduit portion 26 and/or the angled or pointed portion 92 may be disposed at or about a front of the second conduit portion 26. A tear drop-shaped configuration may facilitate forming of the second conduit portion 26 via additive manufacturing. The second conduit portion 26 may extend from the body 22 at an angle relative to the first conduit portion 24. For example and without limitation, the second conduit portion 26 may extend substantially perpendicular relative to the first conduit portion 24. The second conduit portion 26 may include a tapered portion 94 that may taper radially outward and toward the base 30. The tapered portion 94 may be disposed toward a rear of the second conduit portion 26 and/or may not be visible from the front. A first conduit portion and/or a second conduit portion may, for example and without limitation, include an outer dimension (e.g., a diameter or width) or about 0.5 inches.

With embodiments, a base 30 may be connected to the second conduit portion 26. A base 30 may include one or more of a variety of shapes, sizes, and/or configurations. For example and without limitation, the base 30 may include a base flange 100 and/or a mesh or cage 102. The base flange 100 may include a circular configuration, but the base flange 100 is not limited to a circular configuration and may include other configurations, such as, for example and without limitation, an oval, a square, a rectangle, and/or triangle configuration. The base flange 100 may be connected to or extend from the second conduit portion 26 and/or the tapered portion 94 of the second conduit portion 26. The base flange 100 may be disposed substantially perpendicular to a longitudinal axis 26L of the second conduit portion 26. In embodiments, such as generally illustrated in FIG. 11, the base flange 100 may include an aperture 104 that may provide fluid communication between the mesh 102 and the second conduit portion 26. The aperture 104 may include one or more of a variety of shapes. For example and without limitation, the aperture 104 may include a generally triangular portion 106 and a generally circular portion 108. The generally circular portion 108 may be at least partially aligned with the second conduit portion (e.g., centered at or around axis 26L) and/or may be disposed toward the front of the fluid conduit 20. Additionally or alternatively, the generally triangular portion 106 may be at least partially aligned with the tapered portion 94 and/or may be disposed rearward of the generally circular portion 108. The generally circular portion 108 may include one or more angled portions 110 that may provide the generally circular portion 108 with a tear drop-shaped configuration. The angled portions 110 may be disposed opposite the generally triangular portion 106.

Figure 15:
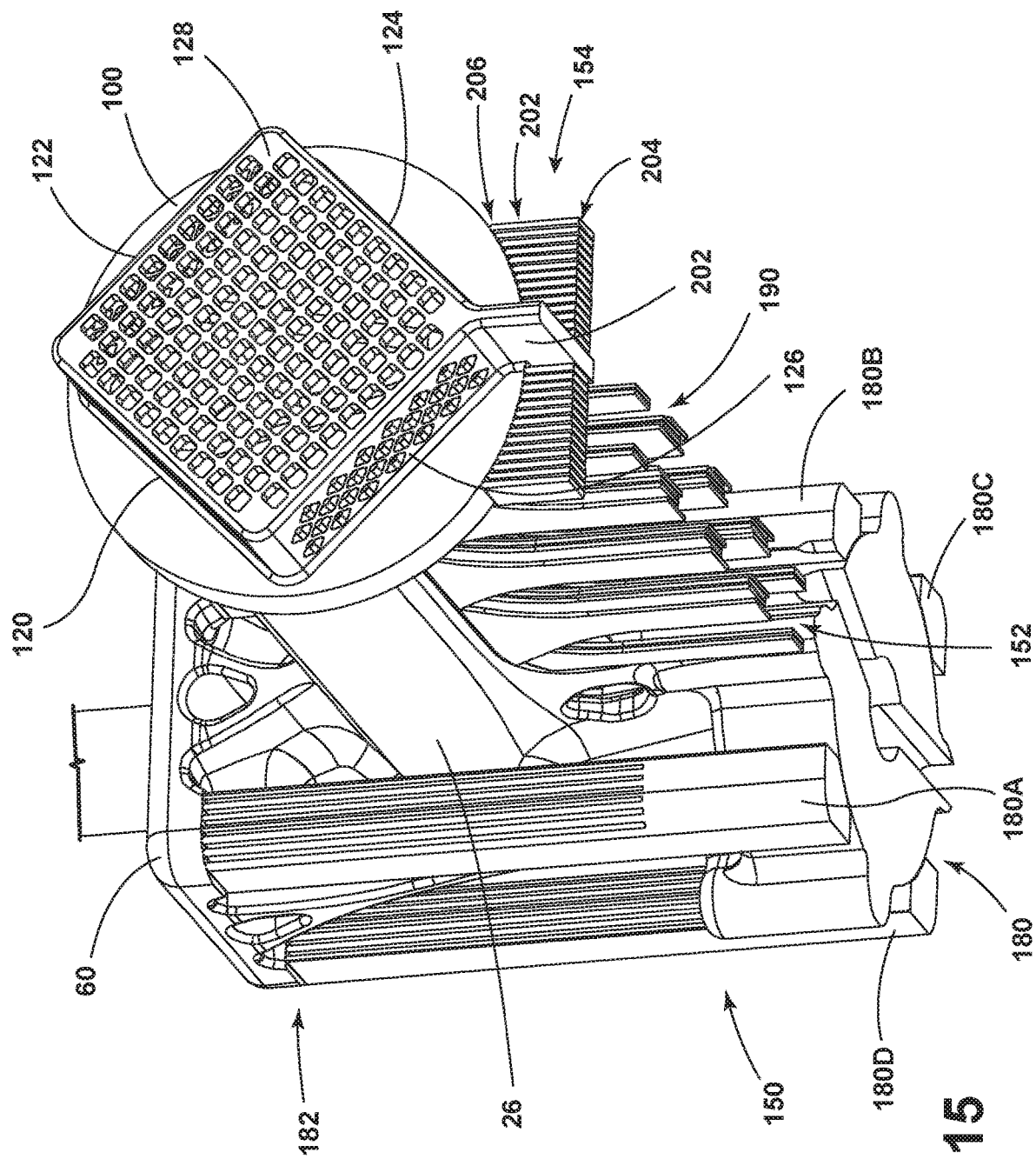
FIG. 15 is a perspective view generally illustrating portions of an embodiment of a fluid conduit and supports according to teachings of the present disclosure.
Figure 15B:
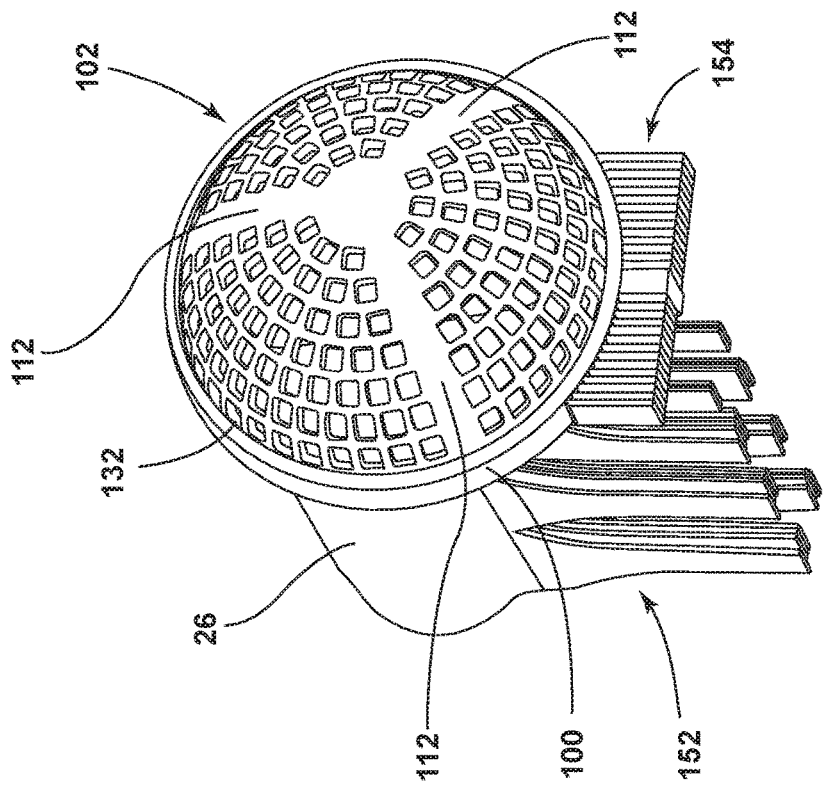
FIGS. 15A, 15B, and 15C are perspective views generally illustrating portions of embodiments of fluid conduits according to teachings of the present disclosure.
Figure 15A:
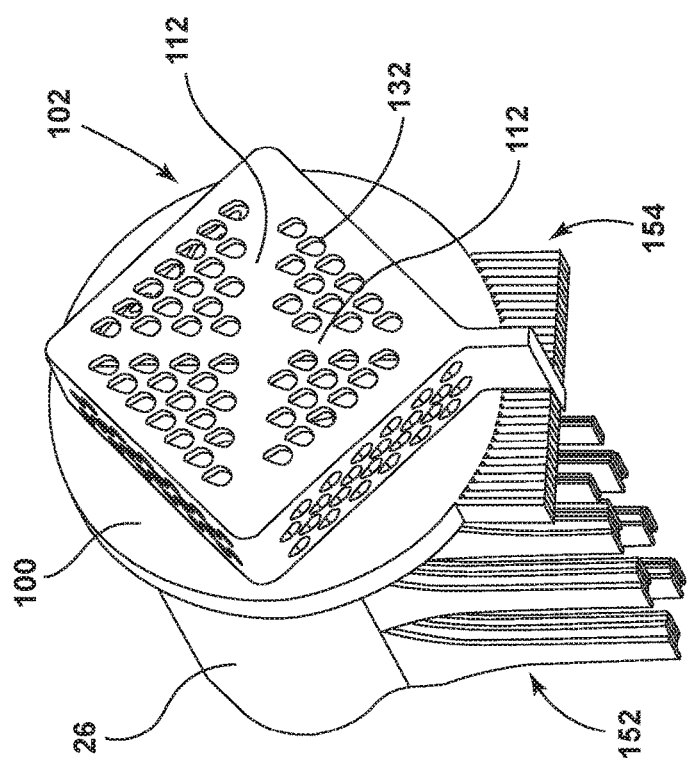
Figure 15C:
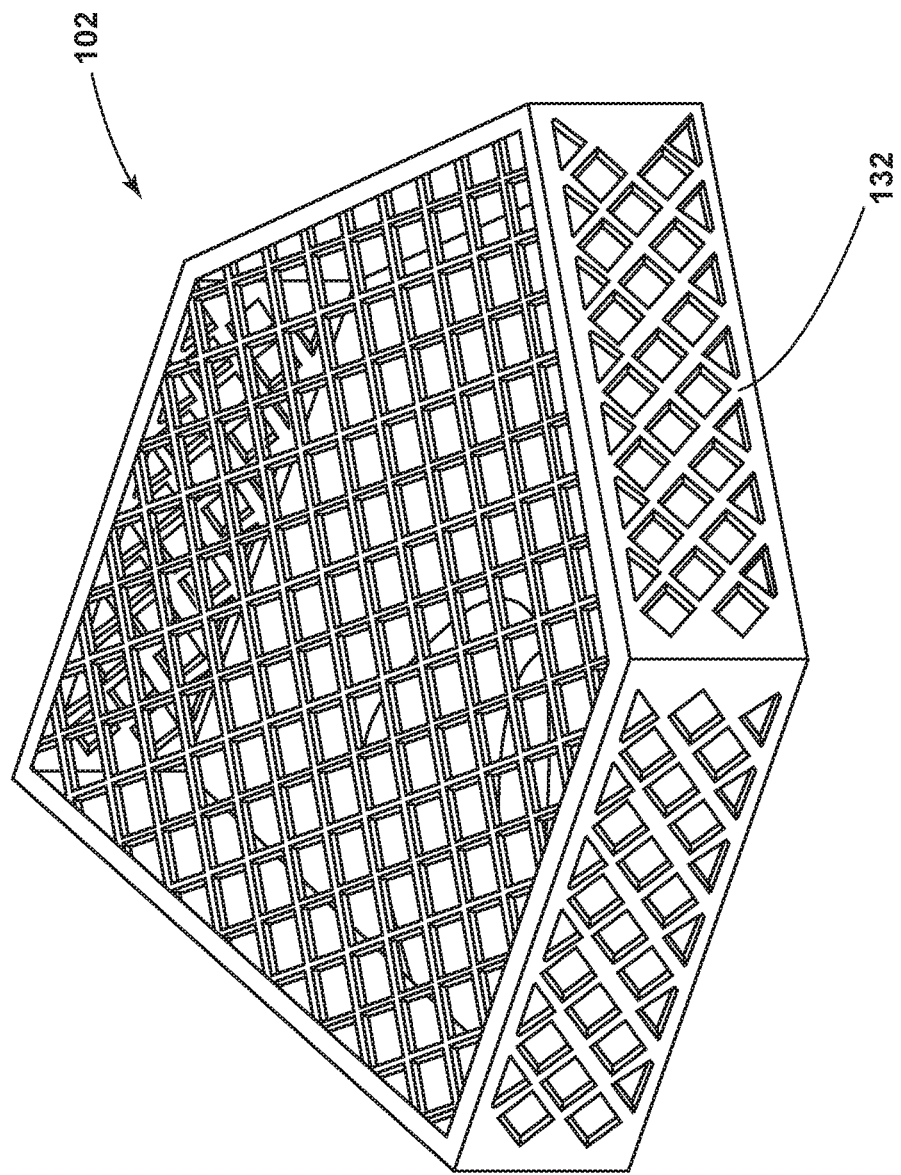

In embodiments, a base 30 may include a mesh 102 that may extend from the base flange 100. The mesh 102 may include one or more of a variety of shapes, sizes, and/or configurations (see, e.g., FIGS. 15, 15A, 15B, and 15C). For example and without limitation, a mesh 102 may include one wall or a plurality of walls that may be disposed in a generally rectangular configuration (e.g., a hollow rectangular prism, such as generally illustrated in FIGS. 15 and 15A), a rounded/hemispherical configuration (e.g., a dome, such as generally illustrated in FIG. 15B), a diamond configuration (which may include a rectangular configuration disposed at an angle), a triangular configuration, a polygon (e.g., a pentagon, such as generally illustrated in FIG. 15C) configuration, and/or other configurations or combinations of such configurations. A plurality of walls may, for example, include a first wall 120, a second wall 122, a third wall 124, a fourth wall 126, and/or a fifth wall 128. The first wall 120, the second wall 122, the third wall 124, and/or the fourth wall 126 may extend substantially perpendicularly from the base flange 100. The fifth wall 128 may be connected to and/or extend from the first wall 120, the second wall 122, the third wall 124, and/or the fourth wall 126. For example and without limitation, the fifth wall 128 may be configured as a bottom wall. A mesh 102 may include an internal chamber 130 that may be defined by the first wall 120, the second wall 122, the third wall 124, the fourth wall 126, and/or the fifth wall 128 (e.g., the mesh 102 may be hollow). One or more of the plurality of walls may include a plurality of apertures 132 that may be configured to allow fluid to flow into the base 30. The apertures 132 may include one or more of a variety of shapes, sizes, and/or configurations. For example and without limitation, and as generally illustrated in FIGS. 15, 15A, 15B, and 15C, the apertures 132 may be rectangular, square, triangular, and/or tear drop shaped (or may be other shapes), and may be disposed to provide a lattice configuration. With embodiments, the base flange 100 may extend (e.g., radially) beyond the mesh 102 in one or more directions. For example and without limitation, the base flange 100 may extend radially beyond the first wall 120, the second wall 122, the third wall 124, and/or the fourth wall 126. The second fluid conduit 26 may or may not be centered on the base flange 100. With embodiments, the second fluid conduit may be off-center relative to the center of the base flange 100 and/or may be disposed toward, at, or about a front of the base flange 100. A mesh 102 may include one or more bracing portions 112. Bracing portions 112 may be disposed in one or more of a variety of configurations. For example and without limitation, bracings portions 112 may be disposed in an intersecting configuration (see, e.g., FIG. 15A), and/or may be disposed in a hub and spoke configuration (see, e.g., FIG. 15B), among other configurations. Bracing portions 112 may correspond to portions of a mesh 102 that do not include any apertures 132.

In embodiments, a fluid conduit 20 may include a fluid passage 136 (e.g., an internal fluid passage). The fluid passage 136 may extend from the base 30 (e.g., from the mesh 102), through the second conduit portion 26, into the body 22 (e.g., via the second fluid port 42), through the body 22, into the first conduit portion 24 (e.g., via the first fluid port 40), and/or through the first conduit portion 24 to an outlet port 138 of the first conduit portion 24. The third fluid port 44 and/or the nozzle 48 may be in fluid communication with the fluid passage 136. In embodiments, the fluid conduit 20 may be configured to cause, facilitate, and/or allow fluid at or near the mesh 102 to flow through the fluid passage 136 to the outlet port 138.

With embodiments, some or all of a fluid conduit 20 may be formed as a monolithic component (e.g., a single, unitary, integrated piece), such as via additive manufacturing, which may include and/or be referred to as three-dimensional (3D) printing. For example and without limitation, the body 22, the first conduit portion 24, the second fluid conduit 26, and the base 30, and all portions of each (e.g., the nozzle 48, the base flange 100, the mesh 102, etc.), may be formed as a monolithic component. Forming a fluid conduit 20 as a monolithic component may allow the fluid conduit 20 to be void of any joints and/or internal fluid seals, such as to seal joints between components. For example and without limitation, a fluid conduit 20 may not include fluid sealing members between any of the body 22, the nozzle 48, the first conduit portion 24, the second conduit portion 26, the base 30, the base flange 100, or the mesh 102). Additionally or alternatively, forming a fluid conduit 20 as a monolithic component may allow the fluid conduit 20 to be connected together (e.g., originally formed) without fasteners, welding, joining, or other connection components or methods.

Figure 12:
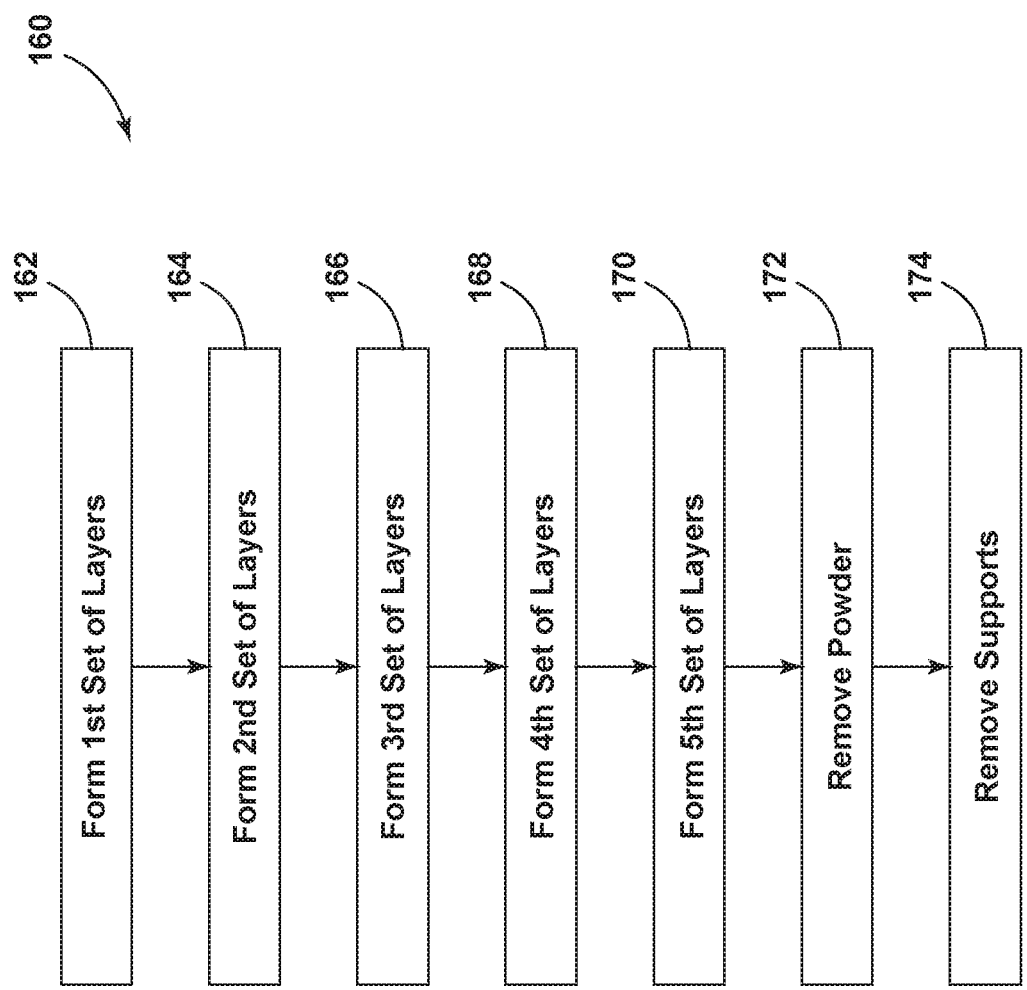
FIG. 12 is a flow diagram of an embodiment of a method of making a fluid conduit according to teachings of the present disclosure.
Figure 13A:
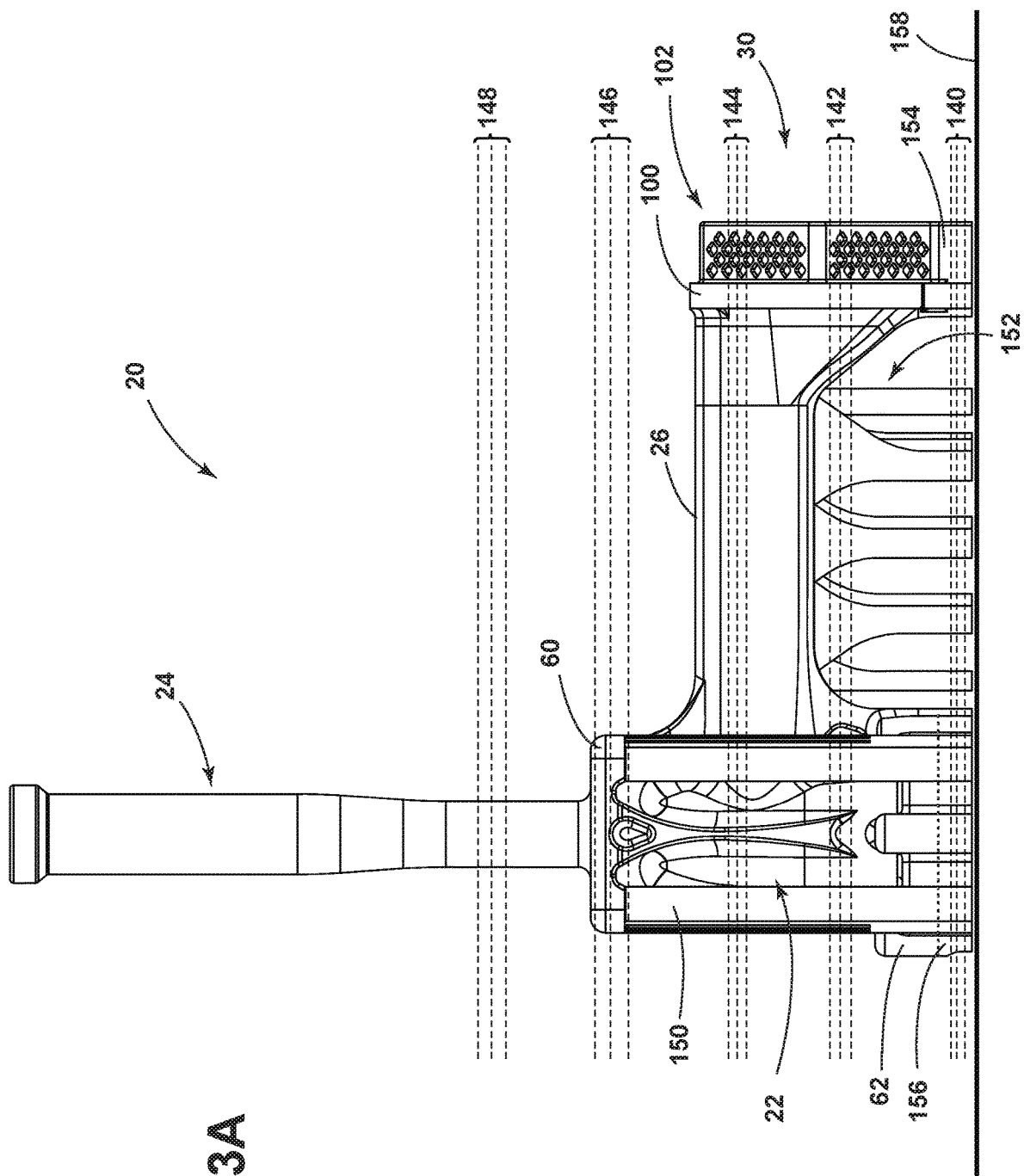
FIG. 13A is a left side view generally illustrating embodiments of a fluid conduit, supports, and sets of layers according to teachings of the present disclosure.
Figure 13B:
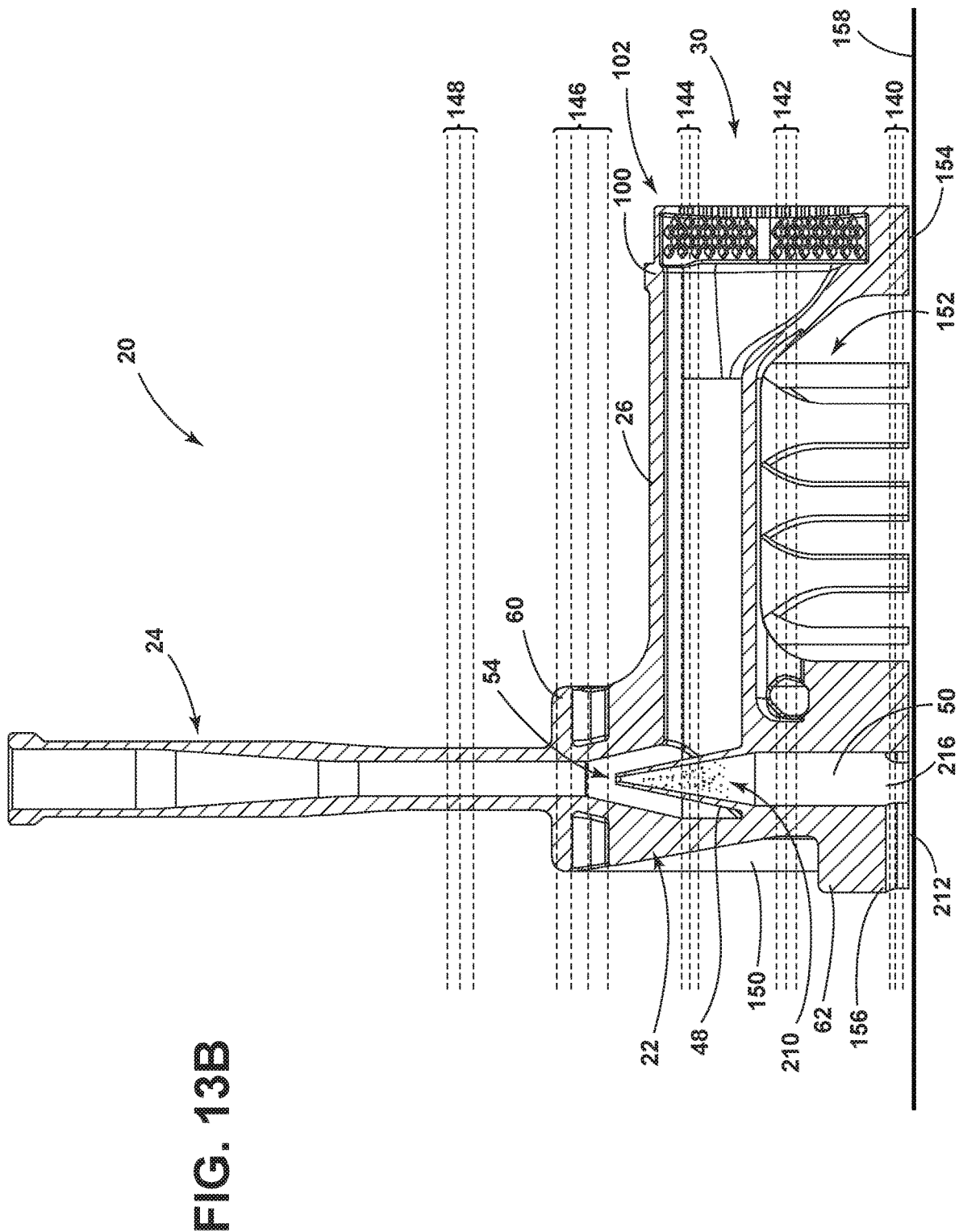
FIG. 13B is a cross-sectional view generally illustrating portions of embodiments of a fluid conduit, supports, and sets of layers according to teachings of the present disclosure.

In embodiments, such as generally illustrated in FIGS. 12, 13A, and 13B, a fluid conduit 20 may be made or formed via additive manufacturing, which may include forming a fluid conduit 20 via sets of layers. The body 22, the first conduit portion 24, the second conduit portion 26, and/or the base 30 may be formed via sets of layers. For example and without limitation, a fluid conduit 20 may be formed via a first set of layers 140, a second set of layers 142, a third set of layers 144, a fourth set of layers 146, and/or a fifth set of layers 148. A fluid conduit 20 may be formed starting with a rear of the fluid conduit 20 and formed progressively toward the front of the fluid conduit 20 (e.g., may not be formed from bottom up or from top down). A set of layers may include one or more layers (e.g., 1 layer, 10 layers, 37 layers, 1,000 layers, etc.).

With embodiments, such as generally illustrated in FIGS. 13A-17, making or forming a fluid conduit 20 may include forming one or more supports that may be used for at least temporarily supporting one or more portions of a fluid conduit 20 during manufacture or formation. For example and without limitation, forming a fluid conduit 20 may include forming a first support 150, a second support 152, a third support 154, and/or a fourth support 156.

With embodiments, such as generally illustrated in FIGS. 12, 13A, and 13B, a method 160 of forming a fluid conduit 20 may include forming a first set of layers 140 (step 162), such as on a surface 158 (e.g., a planar surface of a powder bath). A first set of layers 140 may include portions or parts of the first support 150, the second support 152, the third support 154, and/or the fourth support 156, and may or may not include any other portions (e.g., a first set of layers 140 may include only supports that may be later removed and may not include any portion of a final fluid conduit). A second set of layers 142 may be formed, such as on top of the first set of layers 140 (step 164). A second set of layers 142 may include portions or parts of the first support 150, the second support 152, the body 22, and/or the base 30, and may or may not include any other portions. The second set of layers 144 may include portions or parts of the second flange 62 of the body 22, the base flange 100, and/or the mesh 102 of the base 30. A third set of layers 144 may be formed, such as on top of the second set of layers 142 (step 166). The third set of layers 144 may include portions or parts of the first support 150, the second conduit portion 26, and/or the base 30, and may or may not include any other portions. The third set of layers 144 may include portions or parts of the nozzle 48 of the body 22, the base flange 100, and/or the mesh 102 of the base 30. A fourth set of layers 146 may be formed, such as on top of the third set of layers 144 (step 168). The fourth set of layers 146 may include portions or parts of the first support 150 and/or the body 22, and may or may not include any other portions. The fourth set of layers 146 may include portions or parts of the first flange 60 of the body 22. A fifth set of layers 148 may be formed, such as on top of the fourth set of layers 146 (step 170). The fifth set of layers 148 may include portions or parts of the first conduit portion 24, and may or may not include any other portions.

Figure 14:
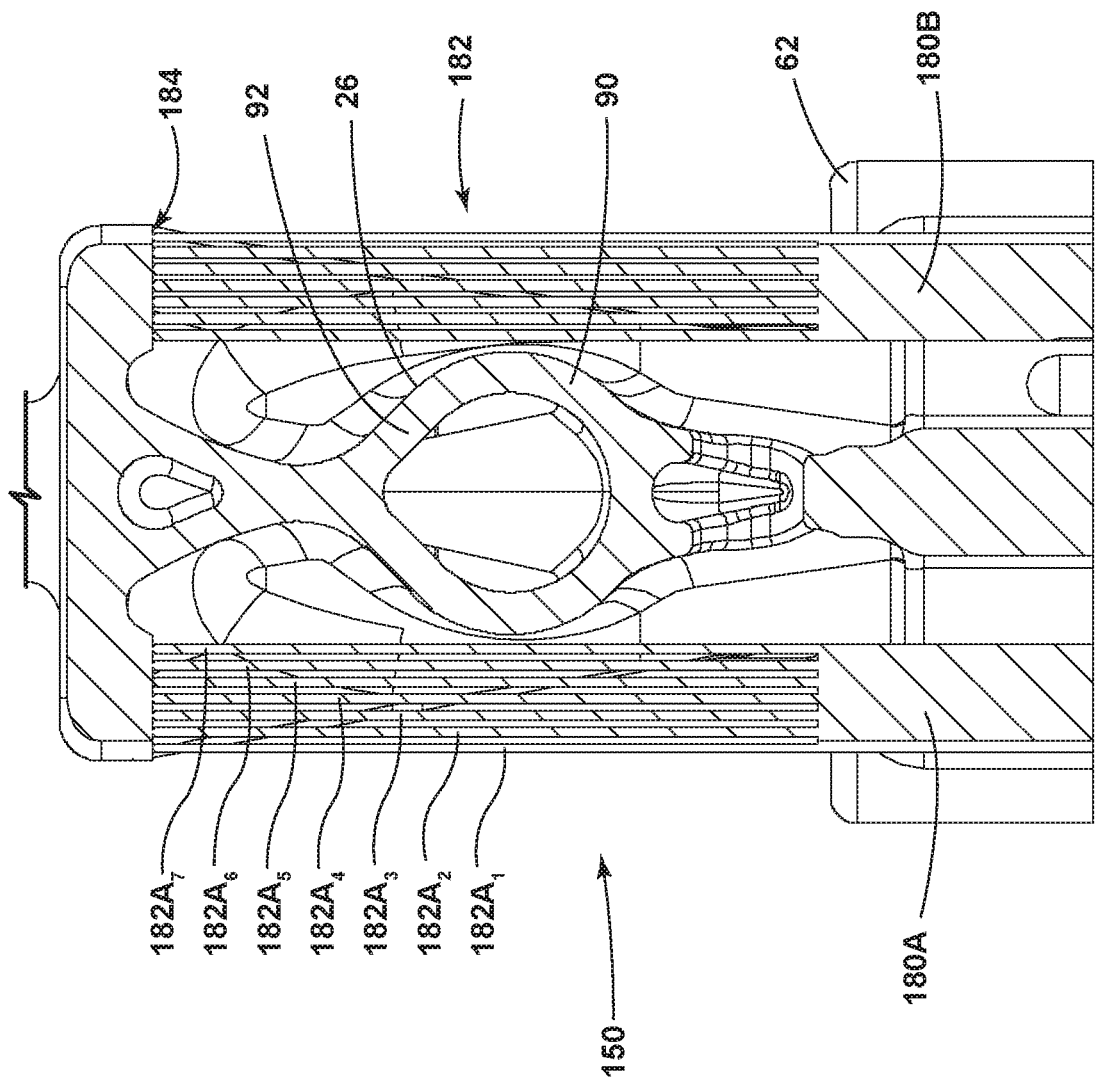
FIG. 14 is a cross-sectional view generally illustrating portions of embodiments of a fluid conduit and support portions according to teachings of the present disclosure.
Figure 16:
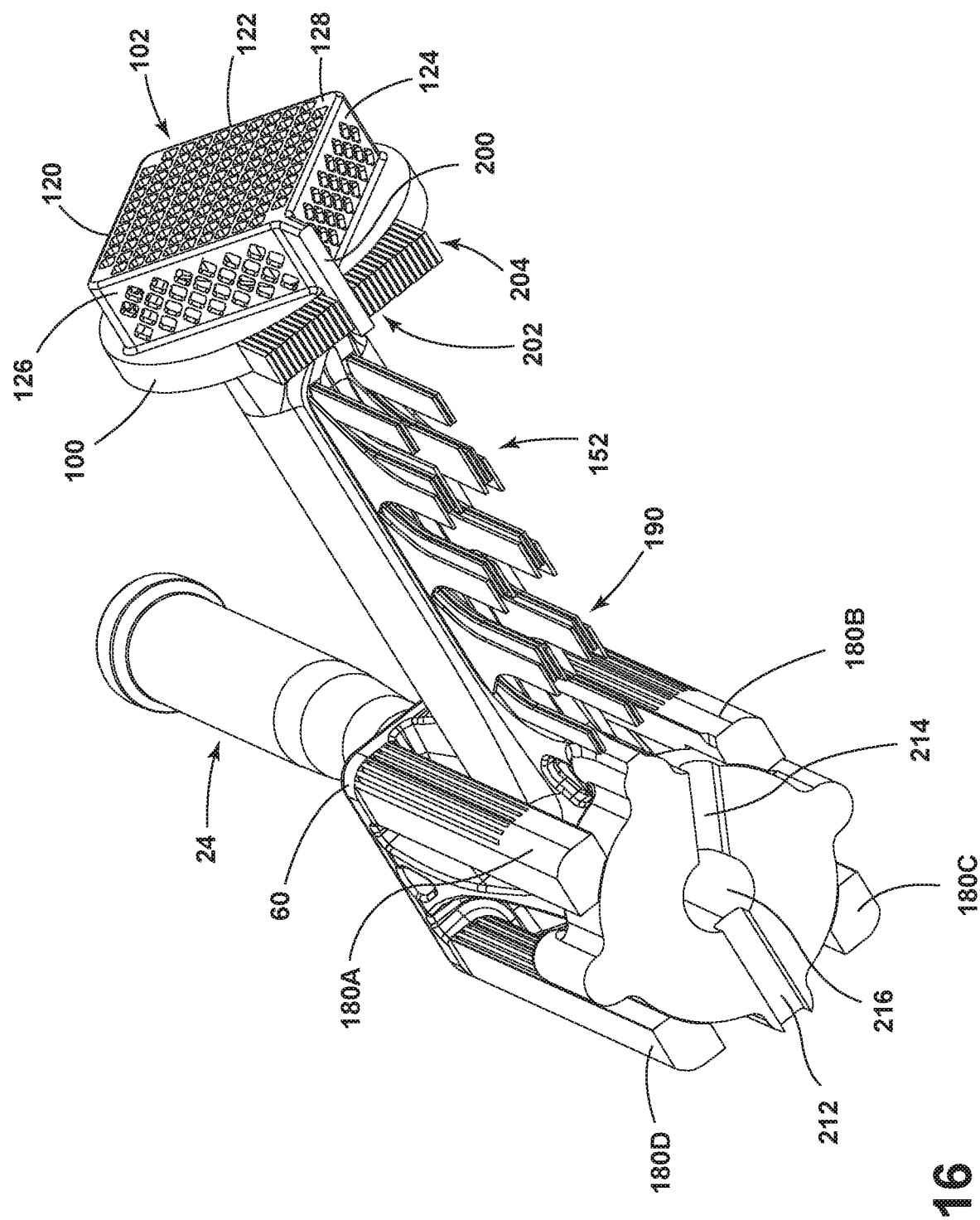
FIG. 16 is a perspective view generally illustrating embodiments of a fluid conduit and supports according to teachings of the present disclosure.

In embodiments, such as generally illustrated in FIGS. 14-16, a first support 150 may be formed to support a first flange 60 of the body 22. The first support 150 may include one or more columns 180 (e.g., four columns 180A, 180B, 180C, 180D) that may include one or more column sections 182. For example and without limitation, a column may include seven column sections (e.g., column 180A may include column sections $182A_1$, $182A_2$, $182A_3$, $182A_4$, $182A_5$, $182A_6$, $182A_7$). The column sections 182 may be generally planar, may be disposed in parallel with each other, and/or may be disposed at a distance from each other such that there may be a gap between one or more column sections 182. One or more column sections 182 may include a tapered portion 184 disposed at or about the first flange 60. The tapered portions 184 may be configured to facilitate removal and/or disconnection of a column 180 from the first flange 60, such as once formation is complete (e.g., during step 174 of method 160).

In embodiments, such as generally illustrated in FIGS. 13A, 13B and 15-17, a second support 152 may be formed to support a second conduit portion 26. A second support 152 may include one or more legs 190 that may be disposed in a first set or rows (e.g., rows 192A, 192B, 192C, 192D) and/or a second set of rows (e.g., rows 194A, 194B, 194C, 194D). The first set of rows may be disposed at a first side of a longitudinal axis 26L of the second conduit portion 26 and/or the second set of rows may be disposed at a second, opposite side of the longitudinal axis 26L of the second conduit portion 26. The first set or rows and/or the second set of rows may include, for example and without limitation, four rows. A row may include one or more legs 190. For example and without limitation, the first set of rows and/or the second set of rows may include outer rows (e.g., rows 192A, 192D, 194A, 194D) that may include three legs 190 and inner rows (e.g., rows 192B, 192C, 194B, 194C) that may include five legs 190. The legs 190 in rows of a set of rows may or may not be aligned (e.g., in a longitudinal direction of the second conduit portion) with each other. For example and without limitation, legs 190 in outer rows may be at least partially offset from each other, legs 190 in inner rows may be aligned with each other, and/or legs in inner rows may be at least partially offset from legs in outer rows.

With embodiments, such as generally illustrated in FIGS. 13A, 13B, and 15-17, a third support 154 may be formed to support a base 30. The third support 154 may include a first section 200 and/or a second section 202. The first section 200 may be solid, may extend in a longitudinal direction (e.g., parallel with axis 26L), may be connected to the base flange 100, and/or may be connected to the mesh 102. The second section 202 may include a plurality of fins 204 that extend from and/or be connected to the base flange 100. The fins 204 may be generally planar and may be spaced from each other. The fins 204 may have different heights, such as to provide a generally arc-shaped configuration that may correspond to an outer edge of the base flange 100. One or more of the fins 204 may include a tapered portion 206 disposed at or about the base flange 100. The tapered portions 206 may be configured to facilitate removal and/or disconnection of the fins 204 from the base flange 100, such as once formation of the fluid conduit 20 is complete (e.g., in step 174 of method 160).

In embodiments, such as generally illustrated in FIGS. 13A, 13B, 14, 16, and 17, a fourth support 156 may be formed to support the body 22. The fourth support 156 may extend from and/or be connected to the second flange 62 of the body 22. For example and without limitation, the fourth support 156 may effectively be configured as an extension of the second flange 62.

Figure 17:
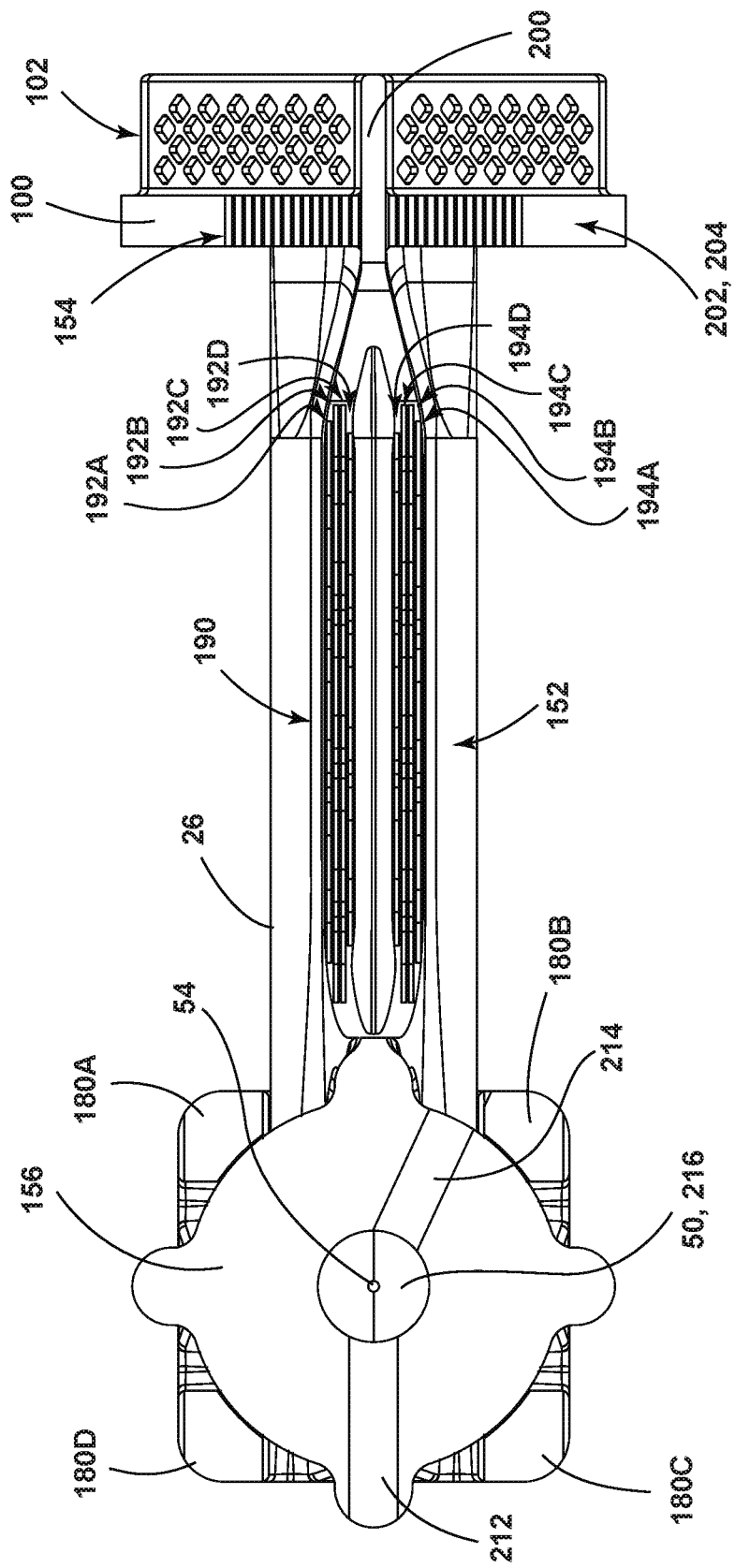
FIG. 17 is a bottom view generally illustrating embodiments of a fluid conduit and supports according to teachings of the present disclosure.
Figure 18:
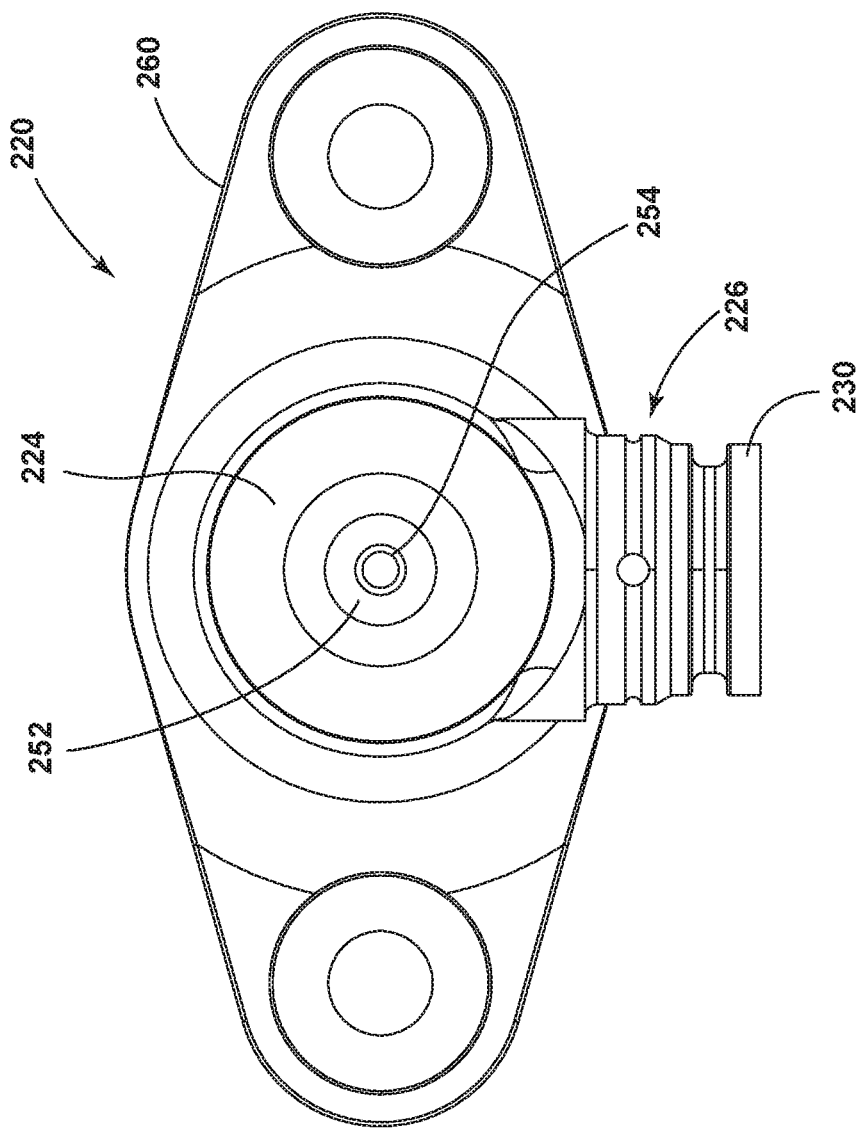
FIG. 18 is a front view generally illustrating an embodiment of a fluid conduit according to teachings of the present disclosure.
Figure 19:
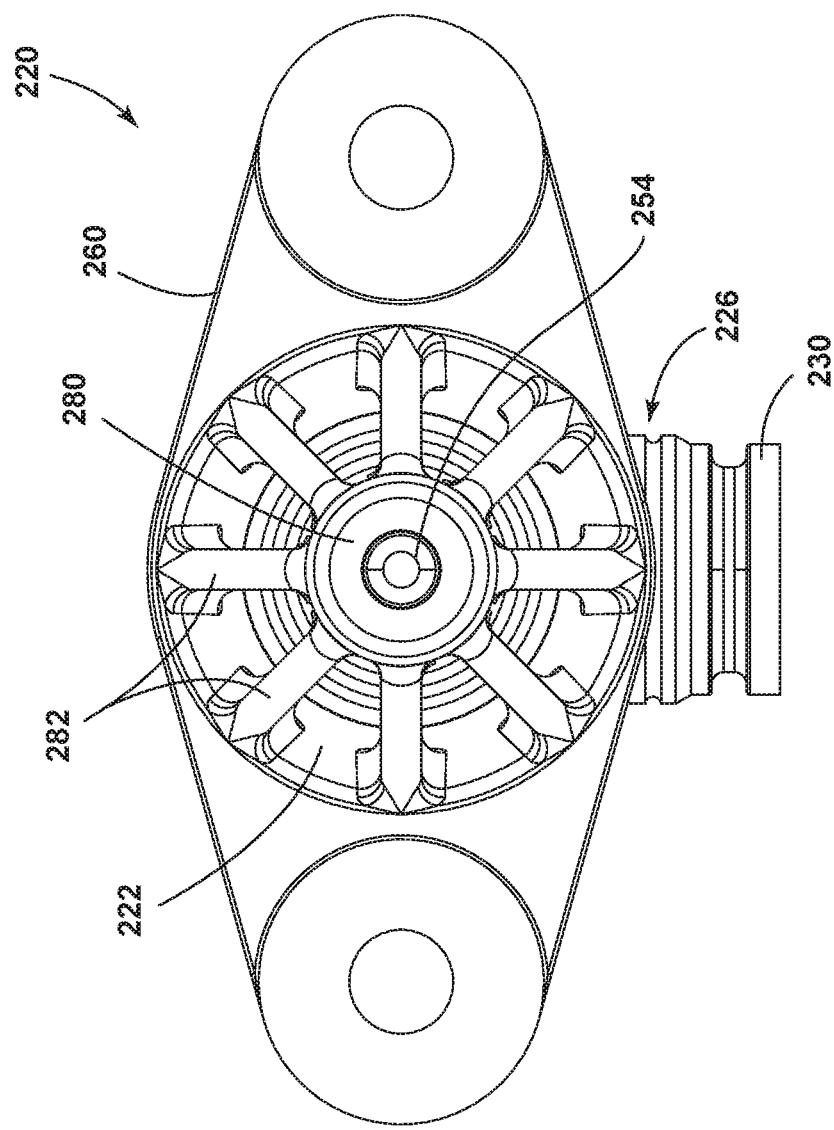
FIG. 19 is a rear view generally illustrating an embodiment of a fluid conduit according to teachings of the present disclosure.
Figure 20:
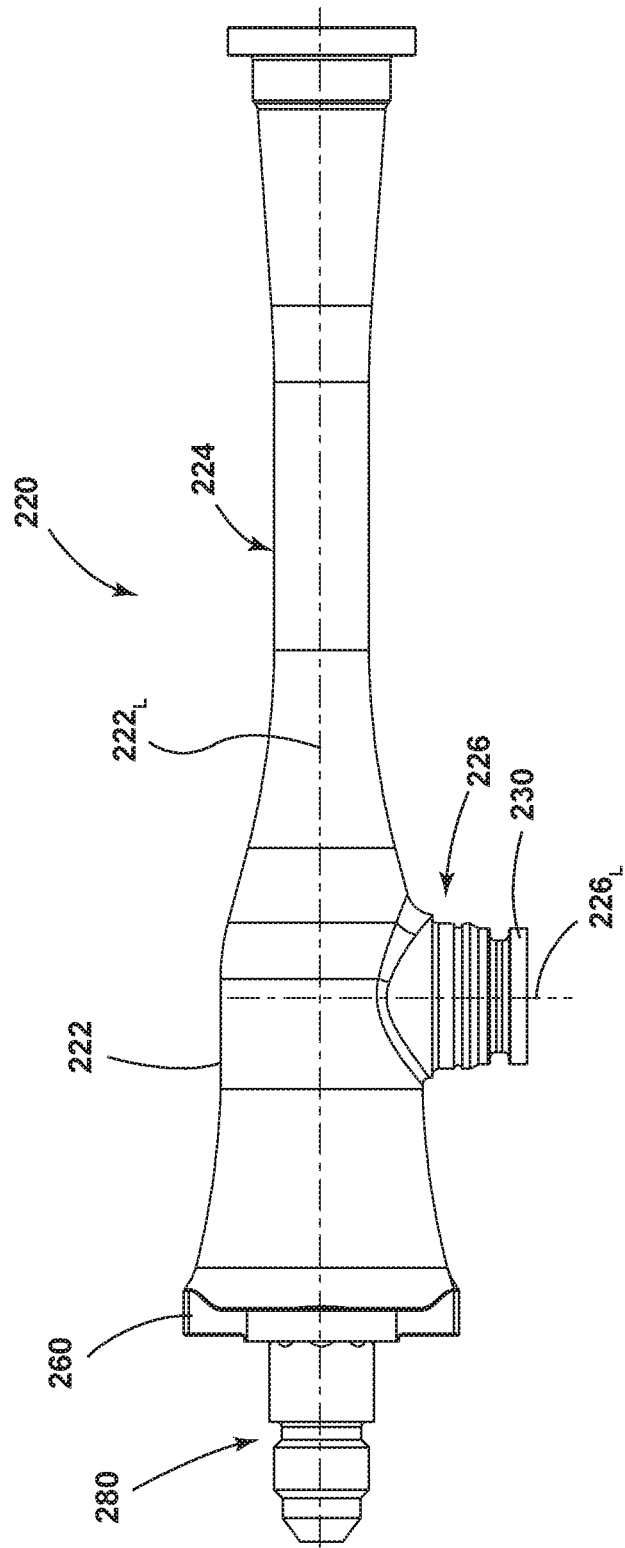
FIG. 20 is a left side view generally illustrating an embodiment of a fluid conduit according to teachings of the present disclosure.
Figure 21:
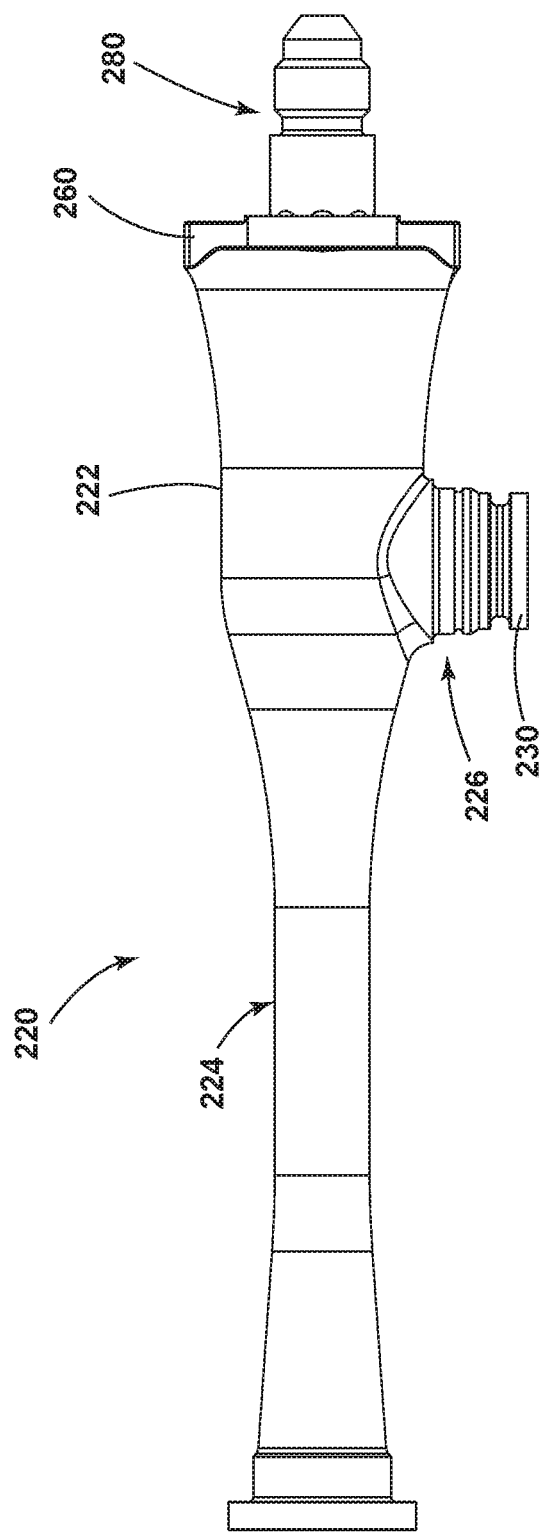
FIG. 21 is a right side view generally illustrating an embodiment of a fluid conduit according to teachings of the present disclosure.
Figure 22:
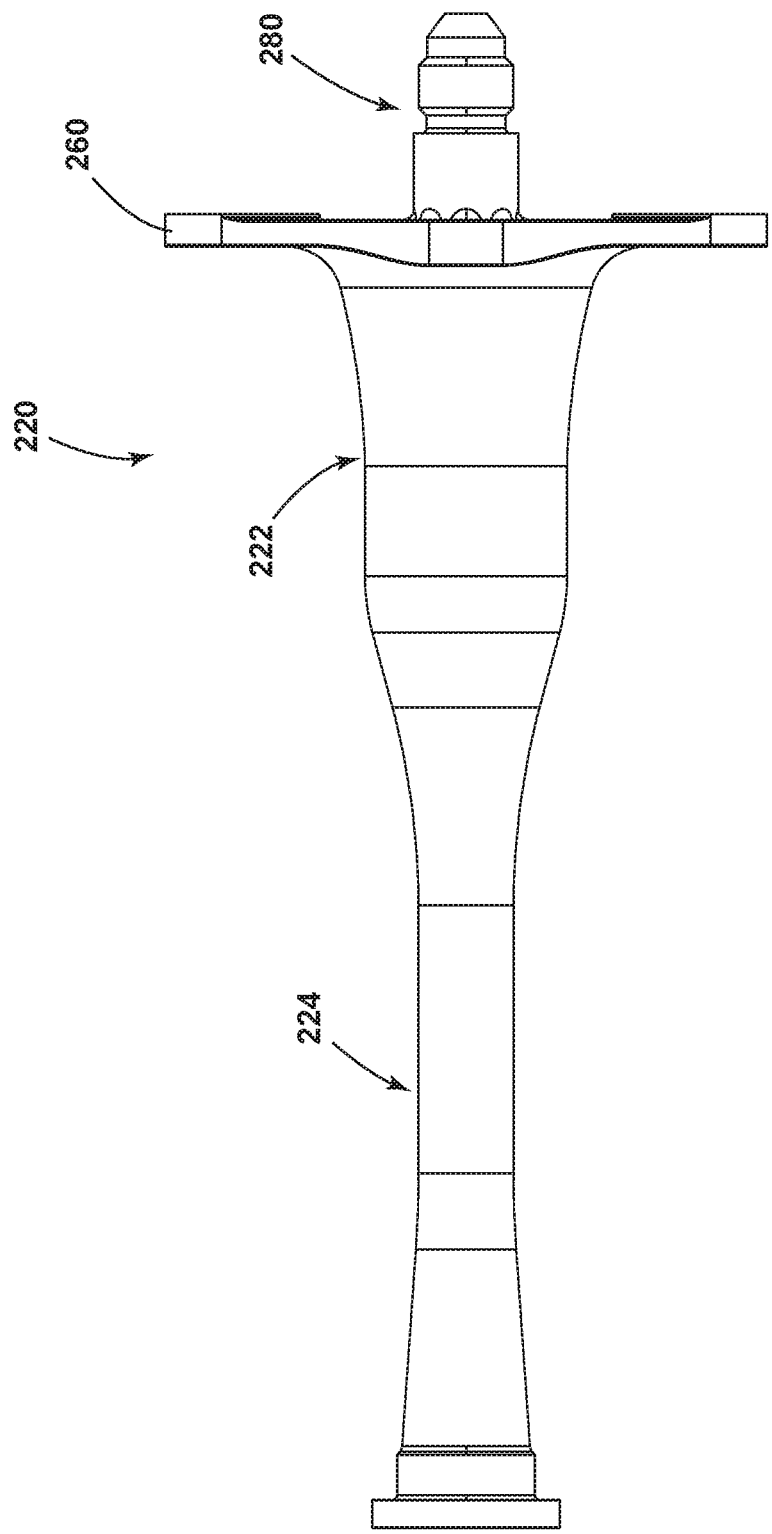
FIG. 22 is a top view generally illustrating an embodiment of a fluid conduit according to teachings of the present disclosure.
Figure 23:
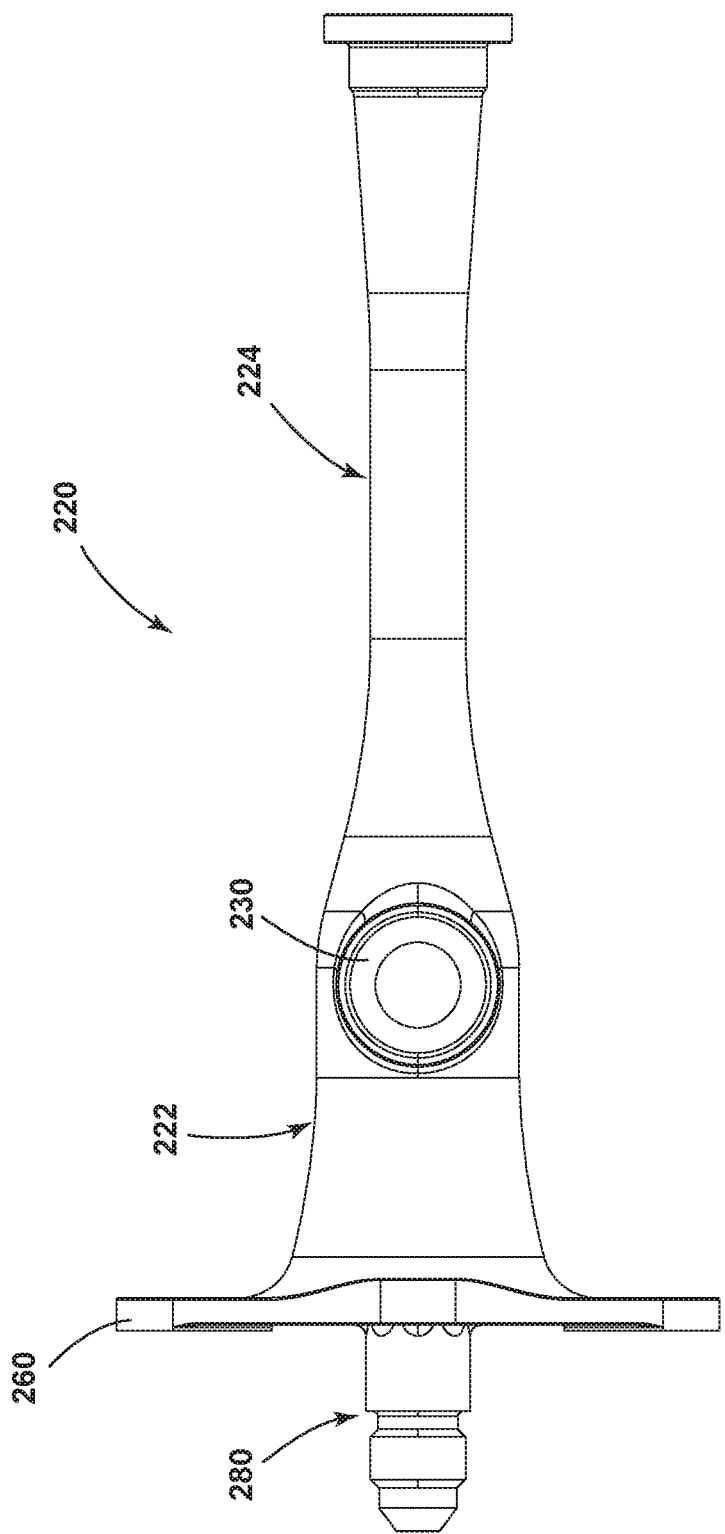
FIG. 23 is a bottom view generally illustrating an embodiment of a fluid conduit according to teachings of the present disclosure.
Figure 24:
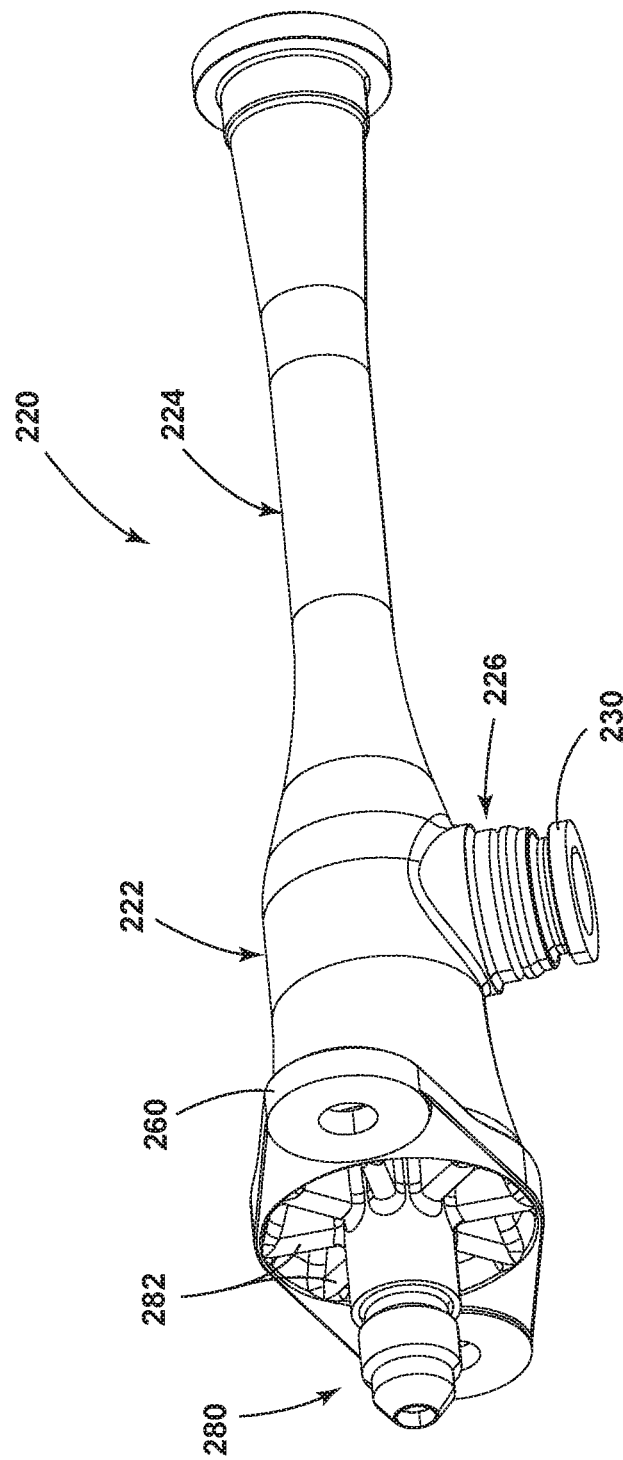
FIG. 24 is a perspective view generally illustrating an embodiment of a fluid conduit according to teachings of the present disclosure.
Figure 25:
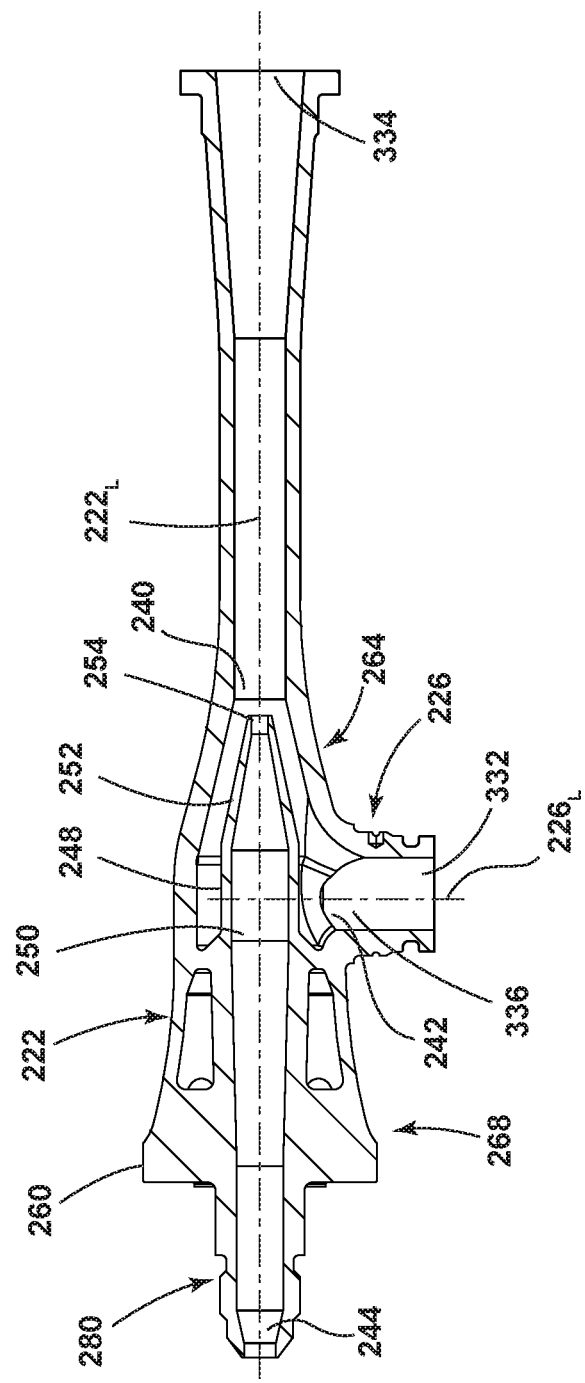
FIG. 25 is a cross-sectional view generally illustrating portions of an embodiment of a fluid conduit according to teachings of the present disclosure.
Figure 26:
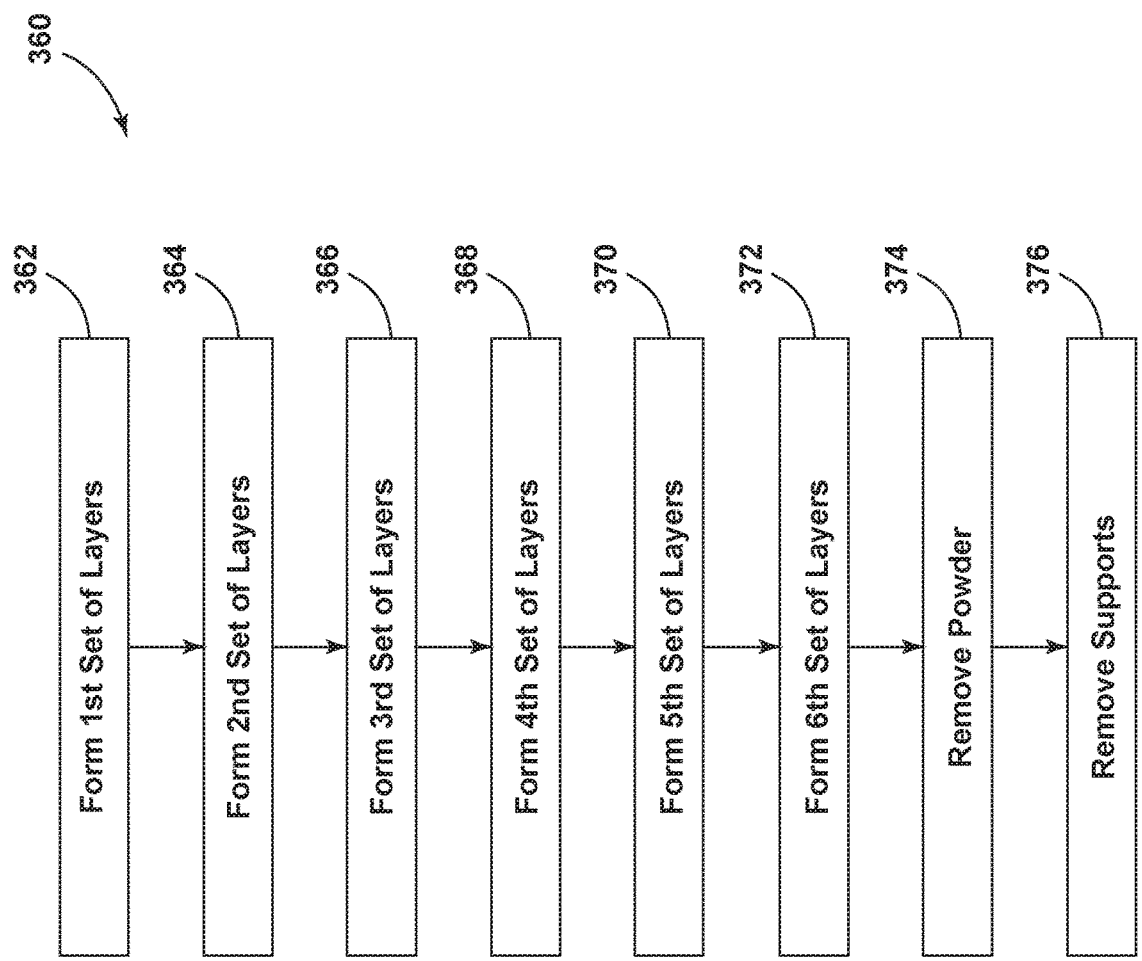
FIG. 26 is a flow diagram of an embodiment of a method of making a fluid conduit according to teachings of the present disclosure.
Figure 27:
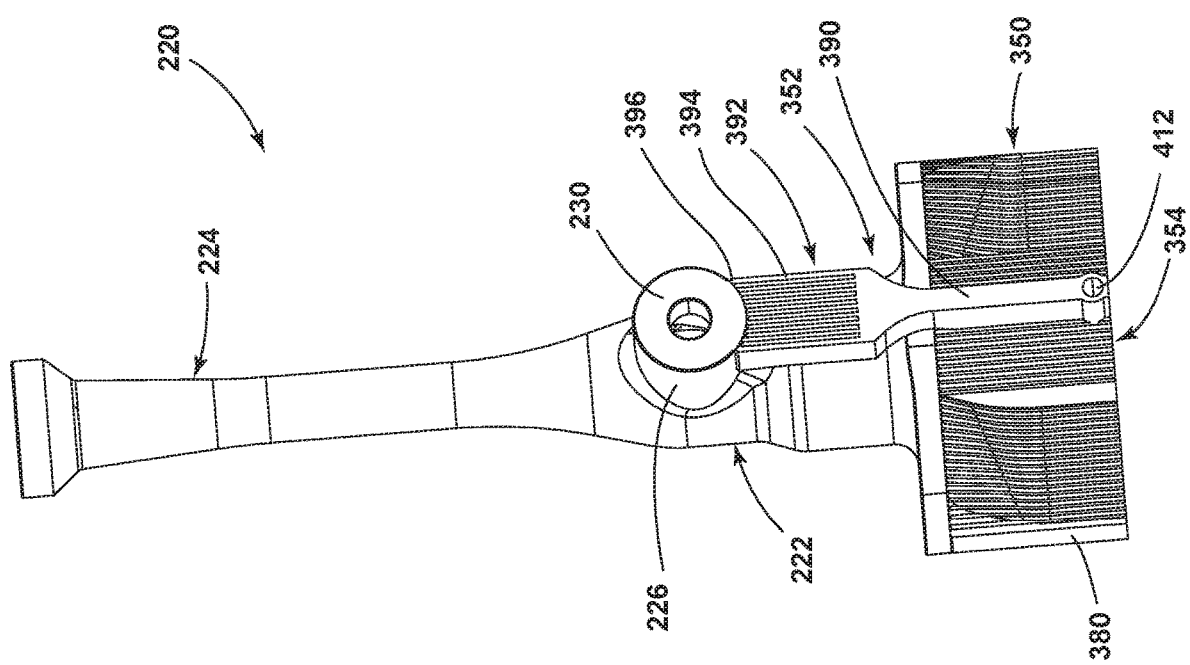
FIGS. 27-29 are perspective views generally illustrating portions of embodiments of fluid conduits and supports according to teachings of the present disclosure.
Figure 28:
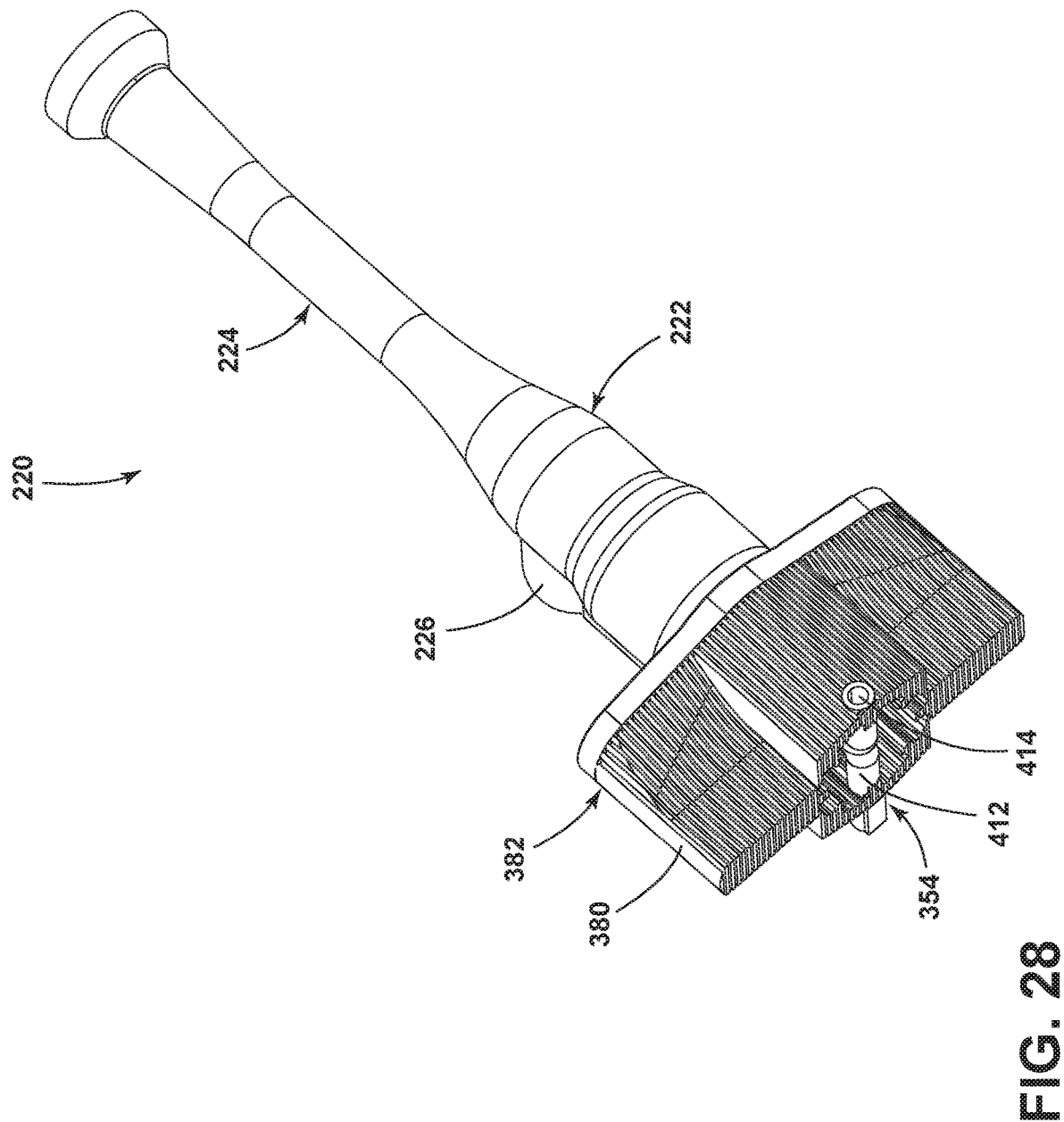
Figure 29:
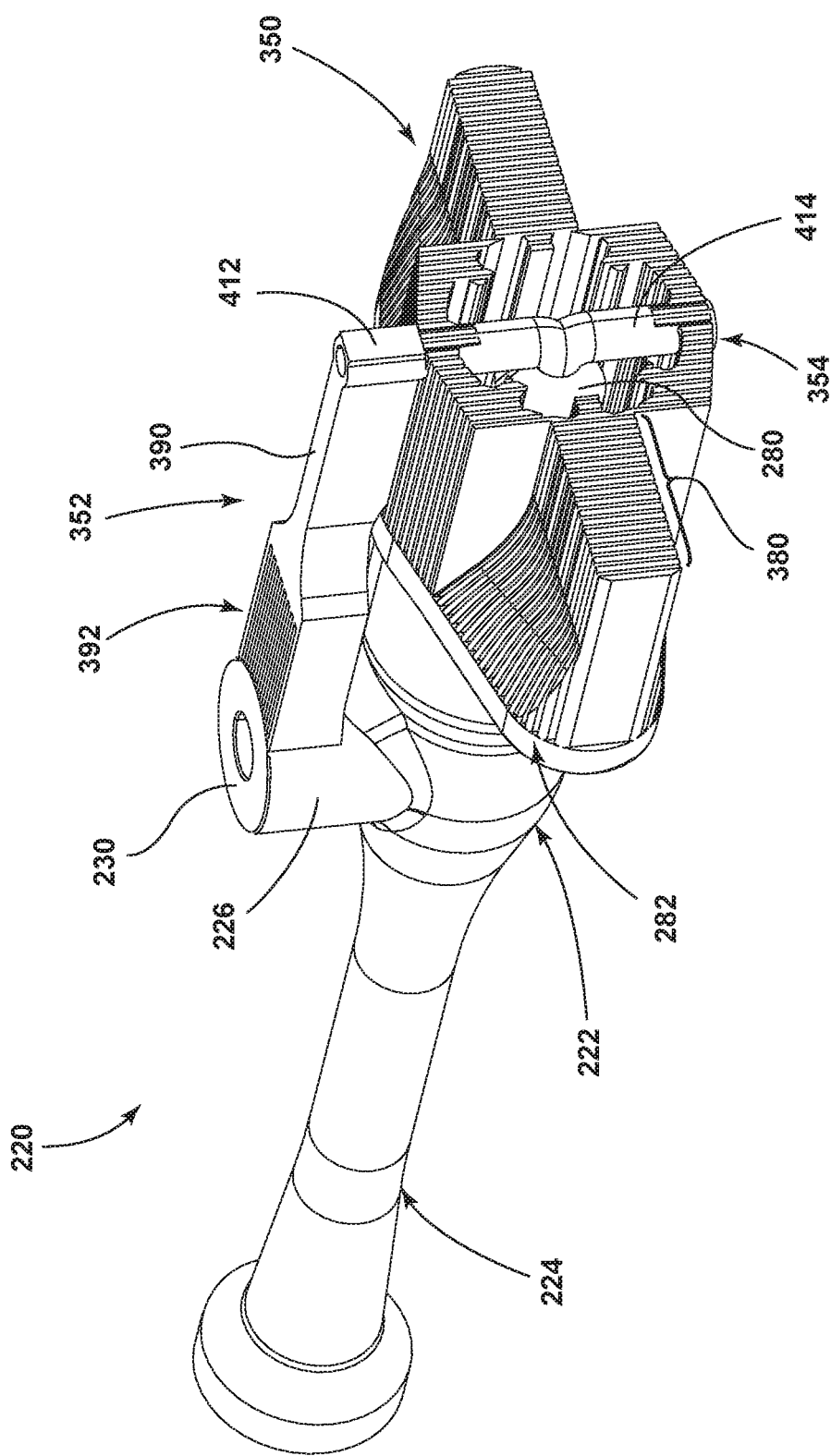
Figure 30:
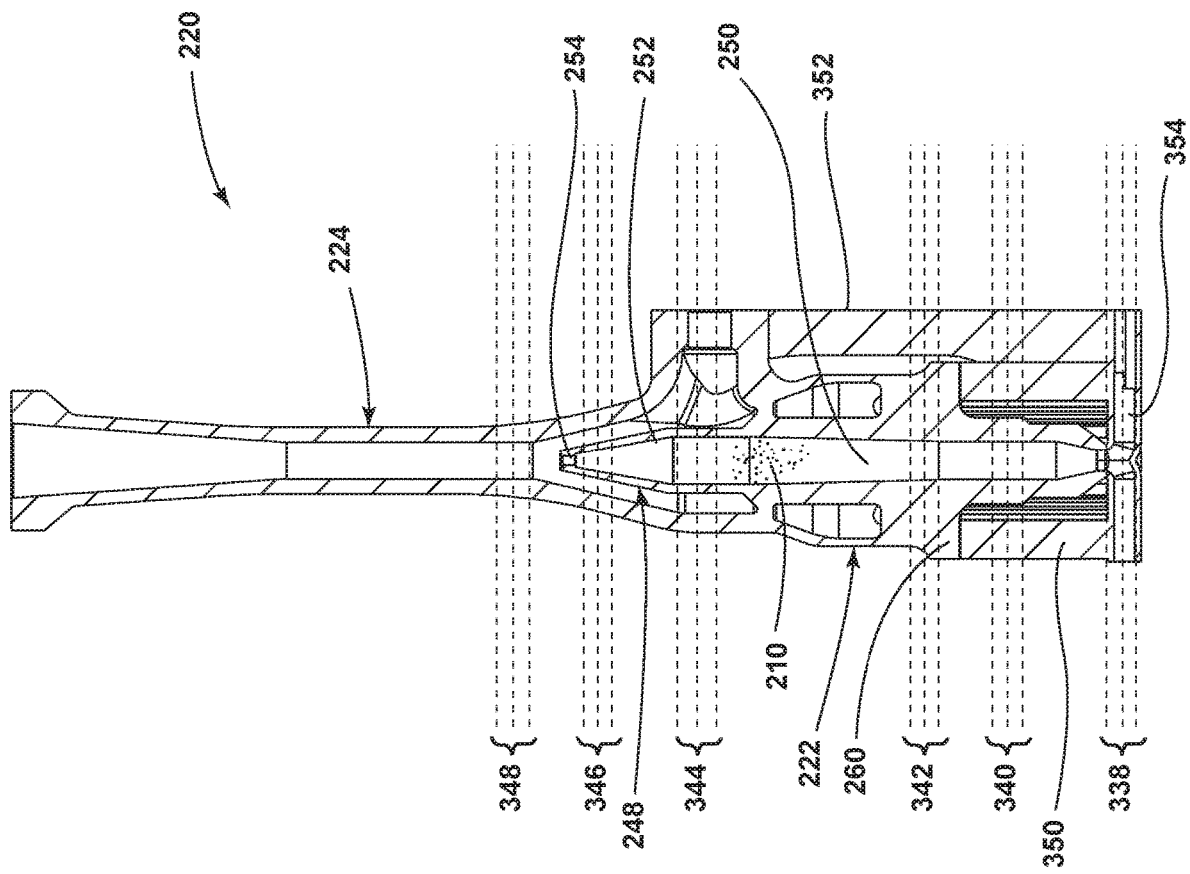
FIG. 30 is a cross-sectional view generally illustrating portions of embodiments of a fluid conduit and support portions according to teachings of the present disclosure.

In embodiments, some or all of forming a fluid conduit 20 may be conducted in a powder bed. It may be desirable to remove powder 210 from one or more portions of a fluid conduit 20 (see, e.g., FIG. 13B). Forming a fluid conduit 20 may include removing powder 210 from a fluid conduit 20 (e.g., in step 172 of method 160), such as prior to removal of some or all supports. Gravity may be utilized in some cases to remove powder 210. Additionally or alternatively, fluid (e.g., pressurized air) may be provided to or removed from (e.g., via negative pressure and/or a vacuum) a fluid conduit 20 to remove powder 210. For example and without limitation, and as generally illustrated in FIGS. 16 and 17, the fourth support 156 may include one or more channels 212, 214, and a cavity 216 that may be in fluid communication with the nozzle 48 (e.g., forming fourth support 156 may include forming the one or more channels 212, 214 and/or the cavity 216). The cavity 216 of the fourth support 156 may be partially or completely aligned with the cavity 50 of the nozzle 48. The one or more channels 212, 214 may be connected to a fluid source and may provide fluid to the cavity 216 and into the body 22, and the fluid may flow within the body 22 and/or cavities 50, 216. In some cases, such as with fourth supports 156 having a single channel 212 or 214, the fluid may cause powder 210 in the body 22 to move through the nozzle 48 and out through the first conduit portion 24 (or fluid may be provided to the nozzle 48 and powder 210 may exit via the channel 212 or 214). In other cases, such as with fluid conduits 20 having a fourth support 156 including a first channel 212 (e.g., an inlet channel), a second channel 214 (e.g., an outlet channel), and/or a aperture 54 of a nozzle 48 at least temporarily blocked, fluid may be provided from the fluid source to the inlet channel 212, the fluid may flow through the cavity 216 and into the body 22, and the fluid may cause powder 210 in the body 222 to move through (e.g., down) the cavity 216 and out through the outlet channel 214. It should be understood that references to powder 210 are not necessarily limited to powder and could include other materials or substances, such as dust, debris, or other foreign matter.

In embodiments, forming a fluid conduit 20 may include removing one or more supports (step 174). Removing supports may include removing a first support 150, a second support 152, a third support 154, and/or a fourth support 156. Removing a support (and/or subsequent surface treatment) may include one or more of machining, grinding, sanding, breaking, bending, and snapping, among others.

In embodiments, such as generally illustrated in FIGS. 18-25, a fluid conduit 220 may include a body 222, a first conduit portion 224, a second conduit portion 226, and/or a base 230. The body 222 may include a first fluid port 240, a second fluid port 242, and/or a third fluid port 244. The first fluid port 240 may be disposed at a front 264 of the body 222, the second fluid port 242 may be disposed at or about a bottom of the body 222, and/or the third fluid port 244 may be disposed at or about a rear 268 of the body 222. The first conduit portion 224 may be connected to and/or extend from the first fluid port 240. The second conduit portion 226 may be connected to and/or extend from the second fluid port 242. The body 222 may include a nozzle 248 that may include a cavity 250, a tapered portion 252, and/or an aperture 254. The body may include or more flanges, such as a flange 260 that may be disposed at or about a rear end 268 of the body 222. A longitudinal axis 222L of the body may be disposed substantially perpendicular to a longitudinal axis 226L of the second conduit portion 226. The first conduit portion 224 may include a fluid port 334, such as an outlet port. The second conduit portion 226 may include a fluid port 332, such as an inlet port. A fluid conduit 220 may include a fluid passage 336 may extend from the base 230, through the second conduit portion 226, through the body 222 (e.g., via the second fluid port 242 and the first fluid port 240), through the first conduit portion 224, and/or to the outlet port 334 of the first conduit portion 224. The nozzle 248 may extend at least partially into the fluid passage 336 and/or may intersect with the longitudinal axis 226L of the second conduit portion. The body 222 may include a protrusion 280 that may be disposed at or about a rear end 268 of the body. The protrusion 280 that may be supported via one or more support formations 282 that may extend radially outward from the protrusion 280. The protrusion 280 may be connected to, formed with, and/or part of the nozzle 248. The protrusion 280 may be disposed opposite the tapered portion 252 (e.g., in a longitudinal direction).

With embodiments, such as generally illustrated in FIGS. 26-30, a method 360 of making or forming a fluid conduit 220 may be similar to method 160 and/or may include forming one or more sets of layers. The method 360 may include forming one or more supports, such as a first support 350, a second support 352, and/or a third support 354.

In embodiments, a method 360 of making or forming a fluid conduit 220 may include additive manufacturing and/or forming sets of layers. Method 360 may include forming a first set of layers 338 (step 362). The first set of layers 338 may include parts or portions of the first support 350, the second support 352, the third support 354, and/or the body 222, and may or may not include any other parts or portions. The third support 354 may include and/or be formed with a first channel or tube 412 and/or a second channel or tube 414. A second set of layers 340 may be formed (step 364), such as on top of the first set of layers 338. The second set of layers 340 may include parts or portions of the first support 350, the second support 352, and/or the body 222, and may or may not include any other parts or portions. A third set of layers 342 may be formed (step 366), such as on top of the second set of layers 340. The third set of layers 342 may include parts or portions of the second support 352 and/or the body 222, and may or may not include any other parts or portions. The third set of layers 342 may include parts or portions of the flange 260. A fourth set of layers 344 may be formed (step 368), such as on top of the third set of layers 342. The fourth set of layers 344 may include parts or portions of the body 222, the second conduit portion 226, and/or the base 230, and may or may not include any other parts or portions. The fourth set of layers 344 may include parts or portion of the nozzle 248. A fifth set of layers 346 may be formed (step 370), such as on top of the fourth set of layers 344. The fifth set of layers 346 may include parts or portions of the body 222, and may or may not include any other parts or portions. The fifth set of layers 346 may include parts or portion of the nozzle 248. A sixth set of layers 348 may be formed (step 372), such as on top of the fifth set of layers 346. The sixth set of layers 348 may include parts or portions of the first conduit portion 224, and may or may not include any other parts or portions. Powder 210 may be removed from the fluid conduit 220 (step 374), such as via the first channel 412 and/or the second channel 414. Supports may be removed (step 376).

In embodiments, the first support 350 may be configured to support the body 222, such as via the flange 260. The first support 350 may include one or more fins 380 that may be spaced from each other and/or that may include tapered portions 382 configured to facilitate removal of the first support 350 from the fluid conduit 220. The second support 352 may be configured to support a second conduit portion 226 and/or a base 230. The second support 352 may, for example and without limitation, include a fork or brush-shaped configuration that may include a first portion 390 (e.g., that may resemble a handle portion of a fork or brush) and/or a second portion 392 (e.g., that may resemble the tines of a fork or bristles of a brush). The second section 392 may include one or more fins 394 that may include tapered portions 396 configured to facilitate removal of the second support 352 from the fluid conduit 220. The third support 354 may be configured to support the body 222. The third support 354 may include a first channel or tube 412 and or may include a second channel or tube 414. The first channel or tube 412 and/or the second channel or tube 414 may be in fluid communication with each other and/or with the third fluid port 244 of the body 222. The first channel 412 may extend into and/or be may be part of the second support 352.

Figure 31:
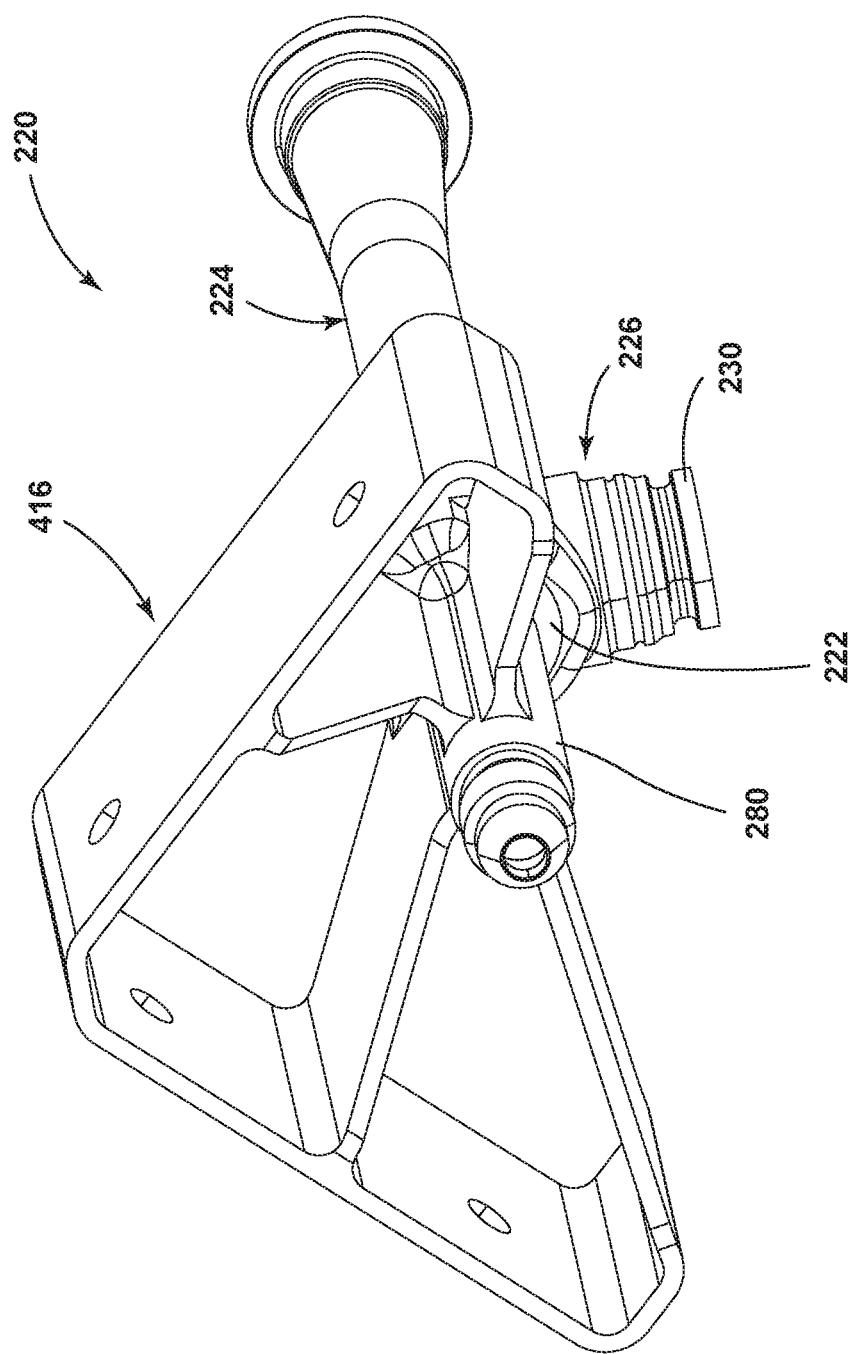
FIG. 31 is a perspective view generally illustrating an embodiment of a fluid conduit with a bracket according to teachings of the present disclosure.

In embodiments, such as generally illustrated in FIG. 31, a fluid conduit 220 may include a bracket 416 that may be connected to and/or integrally formed with (e.g., via additive manufacturing and/or method 360) the body 222. The bracket 416 may include a generally triangular configuration and/or may extend radially outward from the body 222.

With embodiments, a fluid conduit 20, 220 may include one or more of a variety of materials. For example and without limitation, a fluid conduit 20, 220 may include aluminum and/or an aluminum alloy. In embodiments, all of a fluid conduit 20, 220 may be formed of the same material.

In some instances, it may be desirable to avoid forming portions of a fluid conduit 20, 220 without utilizing supports for portions that include angles above a certain threshold, such as, for example and without limitation about 45 degrees (e.g., +/−5 degrees). It may be desirable to utilize supports for portions that are greater than a threshold size, such as, for example and without limitation, portions including diameters of about 0.25 inches or more.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A fluid conduit, comprising:
a body;
a first conduit portion connected to the body;
a second conduit portion connected to the body; and
a base connected to the second conduit portion;
wherein the body, the first conduit portion, the second conduit portion, and the base are formed as a monolithic component via additive manufacturing; the first conduit portion is connected to a first fluid port of the body; the second conduit portion is connected to a second fluid port of the body; the body includes a third fluid port configured for connection with a fluid pump; and the body includes a nozzle connected to and/or extending from the third fluid port towards the first fluid port; and wherein the base includes a mesh configured to receive fluid, the mesh including an internal chamber defined by a plurality of walls each having a plurality of apertures.

2. The fluid conduit of claim 1, wherein at least one of:
the first conduit portion, the first fluid port, the third fluid port, and the nozzle are aligned with a longitudinal axis of the body;
a longitudinal axis of the second conduit portion extends through the nozzle; and
the longitudinal axis of the body is substantially perpendicular to the longitudinal axis of the second conduit portion.

3. The fluid conduit of claim 1, wherein a cross-section of the second conduit portion includes a tear drop configuration.

4. The fluid conduit of claim 3, wherein the tear drop configuration includes a rounded portion and an angled or pointed portion.

5. The fluid conduit of claim 1, wherein the mesh includes a rectangular configuration.

6. The fluid conduit of claim 1, wherein the fluid conduit does not include sealing members between any of the base, the mesh, the first conduit portion, the body, or the second conduit portion.

7. The fluid conduit of claim 1, including an internal fluid passage extending from the base, through the second conduit portion, through the body, and through the first conduit portion.

8. The fluid conduit of claim 7, wherein the nozzle extends at least partially into the internal fluid passage.

9. The fluid conduit of claim 1, wherein the nozzle includes a tapered portion that tapers radially inward and toward the first fluid port.

10. A method of making a fluid conduit, the fluid conduit including a body, a first conduit portion, a second conduit portion, and a base, the body, the first conduit portion, the second conduit portion, and the base being formed as a monolithic component via additive manufacturing; the first conduit portion connected to a first fluid port of the body, the second conduit portion connected to a second fluid port of the body, the body including a third fluid port configured for connection with a fluid pump, and the body including a nozzle connected to and/or extending from the third fluid port towards the first fluid port, the method comprising:

forming a first set of layers, the first set of layers including parts of a first support, a second support, and a third support;

forming a second set of layers, the second set of layers including portions of the body and the second support;

forming a third set of layers, the third set of layers including portions of the body and the second conduit portion; and forming a fourth set of layers, the fourth set of layers including portions of the first conduit portion;

wherein forming the second set of layers includes forming portions of a mesh of the base, the mesh including an internal chamber defined by a plurality of walls each having a plurality of apertures.

11. The method of claim 10, including removing the first support, the second support, and the third support.

12. The method of claim 11, including removing powder from the base.

13. The method of claim 12, wherein removing powder from the base includes providing a fluid to one of a channel and a nozzle of the base, and the powder moving through the other of the channel and the nozzle.

14. The method of claim 10, wherein at least one of the second set of layers and the third set of layers includes parts of the nozzle disposed within the body.

15. The method of claim 10, wherein forming the first set of layers includes forming at least portions of a cavity and a channel connected to the cavity.

16. The method of claim 10, wherein forming the first set of layers includes forming, in the first support, at least portions of a cavity, a first channel connected to the cavity, and a second channel connected to the cavity; and removing powder from the base includes providing a fluid to one of the first channel and the second channel, and the powder moving through the other of the first channel and the second channel.

17. The method of claim 10, wherein the mesh includes a rectangular configuration and a plurality of rectangular apertures; and the base includes a circular section from which the mesh extends.

18. The method of claim 10, wherein the third support includes a plurality of columns of different lengths and the plurality of columns are configured for removal from the base.

19. The method of claim 10, wherein the first support includes a plurality of columns extending from a first end of the body to a flange of the body, and the flange is disposed at a second end of the body.

20. The method of claim 19, wherein at least one of the plurality of columns includes at least three parallel column sections disposed at a distance from each other.

* * * * *